(12) United States Patent
Freel et al.

(10) Patent No.: US 10,337,726 B2
(45) Date of Patent: Jul. 2, 2019

(54) LIQUID BIOMASS HEATING SYSTEM

(71) Applicant: Ensyn Renewables, Inc., Wilmington, DE (US)

(72) Inventors: Barry A. Freel, Ottawa (CA); Geoffrey D. Hopkins, Ottawa (CA); Cameron A. F. Stiles, Ottawa (CA); R. Lee Torrens, Missoula, MT (US); Stefan Muller, North Vancouver (CA)

(73) Assignee: Ensyn Renewables, Inc., Wilmington, DE (US)

( * ) Notice: Subject to any disclaimer, the term of this patent is extended or adjusted under 35 U.S.C. 154(b) by 139 days.

(21) Appl. No.: 15/241,875

(22) Filed: Aug. 19, 2016

(65) Prior Publication Data

US 2017/0051912 A1    Feb. 23, 2017

Related U.S. Application Data

(60) Provisional application No. 62/208,351, filed on Aug. 21, 2015, provisional application No. 62/220,785, filed on Sep. 18, 2015.

(51) Int. Cl.
   *C10L 1/12*   (2006.01)
   *F23C 1/00*   (2006.01)
   *F23M 20/00*  (2014.01)

(52) U.S. Cl.
   CPC ............... *F23C 1/00* (2013.01); *F23M 20/00* (2015.01); *F23C 2900/99009* (2013.01); *F23M 2900/13002* (2013.01)

(58) Field of Classification Search
   CPC ...... F23C 1/00; F23C 1/02; F23C 1/08; F23C 1/10; F23C 2900/9909; F23C 2900/13002; F23M 20/00
   (Continued)

(56) References Cited

U.S. PATENT DOCUMENTS 1,252,072 A    1/1918  Abbot
1,819,459 A *  8/1931  Doherty ................ F23K 5/02
                                                    122/23

(Continued)

FOREIGN PATENT DOCUMENTS

BR    8304158    7/1984
BR    8304794    4/1985

(Continued)

OTHER PUBLICATIONS

AccessScience Dictionary, "ebullating-bed reactor," http://www.accessscience.com, last visited Jul. 15, 2014.
(Continued)

*Primary Examiner* — Vivek K Shirsat
(74) *Attorney, Agent, or Firm* — Jones Day

(57) ABSTRACT

The present disclosure generally relates to the introduction of a liquid biomass in heating systems such as commercial boilers in order to reduce dependence on petroleum-based heating fuel oils as a source of combustion fuel. More specifically, the present disclosure is directed to systems, methods, and apparatuses utilizing a liquid thermally produced from biomass into commercial and industrial boiler or thermal systems such as boilers, furnaces, and kilns, and methods for generating renewable identification numbers (RINs), alternative energy credits (AECs) and renewable energy credits (RECs).

25 Claims, 1 Drawing Sheet

(58) Field of Classification Search
USPC .................................. 431/1–2, 162, 278, 281
See application file for complete search history.

(56) References Cited

U.S. PATENT DOCUMENTS

| | | | |
|---|---|---|---|
| 2,046,767 A * | 7/1936 | Campbell | F23C 1/02 |
| | | | 110/104 B |
| 2,205,757 A | 6/1940 | Wheat | |
| 2,318,555 A | 5/1943 | Ruthruff | |
| 2,326,525 A | 8/1943 | Diwoky | |
| 2,328,202 A | 8/1943 | Doerner | |
| 2,380,098 A | 7/1945 | Doerner | |
| 2,492,948 A | 1/1950 | Berger | |
| 2,566,353 A | 9/1951 | Mills | |
| 2,696,979 A | 12/1954 | Berge | |
| 2,884,303 A | 4/1959 | William | |
| 3,130,007 A | 4/1964 | Breck | |
| 3,309,356 A | 3/1967 | Esterer | |
| 3,313,726 A | 4/1967 | Campbell et al. | |
| 3,445,549 A | 5/1969 | Hakulin | |
| 3,467,502 A | 9/1969 | Davis | |
| 3,503,553 A * | 3/1970 | Schomaker | F23N 5/006 |
| | | | 236/14 |
| 3,694,346 A | 9/1972 | Blaser et al. | |
| 3,696,022 A | 10/1972 | Hutchings | |
| 3,760,870 A | 9/1973 | Guetlhuber | |
| 3,776,533 A | 12/1973 | Vlnaty | |
| 3,814,176 A | 6/1974 | Seth | |
| 3,853,498 A | 12/1974 | Bailie | |
| 3,876,533 A | 4/1975 | Myers | |
| 3,890,111 A | 6/1975 | Knudsen | |
| 3,907,661 A | 9/1975 | Gwyn et al. | |
| 3,925,024 A | 12/1975 | Hollingsworth et al. | |
| 3,927,996 A | 12/1975 | Knudsen et al. | |
| 3,959,420 A | 5/1976 | Geddes et al. | |
| 4,003,829 A | 1/1977 | Burger et al. | |
| 4,032,305 A | 6/1977 | Squires | |
| 4,039,290 A | 8/1977 | Inada et al. | |
| 4,052,265 A | 10/1977 | Kemp | |
| 4,064,018 A | 12/1977 | Choi | |
| 4,064,043 A | 12/1977 | Kollman | |
| 4,085,030 A | 4/1978 | Green et al. | |
| 4,101,414 A | 7/1978 | Kim et al. | |
| 4,102,773 A | 7/1978 | Green et al. | |
| 4,103,902 A | 8/1978 | Steiner et al. | |
| 4,138,020 A | 2/1979 | Steiner et al. | |
| 4,145,274 A | 3/1979 | Green et al. | |
| 4,153,514 A | 5/1979 | Garrett et al. | |
| 4,157,245 A | 6/1979 | Mitchell et al. | |
| 4,165,717 A | 8/1979 | Reh et al. | |
| 4,204,915 A | 5/1980 | Kurata et al. | |
| 4,210,492 A | 7/1980 | Roberts | |
| 4,219,537 A | 8/1980 | Steiner | |
| 4,225,415 A | 9/1980 | Mirza et al. | |
| 4,233,119 A | 11/1980 | Meyers et al. | |
| 4,245,693 A | 1/1981 | Cheng | |
| 4,272,402 A | 6/1981 | Mayes | |
| 4,284,616 A | 8/1981 | Solbakken et al. | |
| 4,298,453 A | 11/1981 | Schoennagel et al. | |
| 4,300,009 A | 11/1981 | Haag et al. | |
| 4,301,771 A | 11/1981 | Jukkola et al. | |
| 4,306,619 A | 12/1981 | Trojani | |
| 4,308,411 A | 12/1981 | Frankiewicz | |
| 4,311,670 A | 1/1982 | Nieminen et al. | |
| 4,317,703 A | 3/1982 | Bowen et al. | |
| 4,321,096 A | 3/1982 | Dobbin | |
| 4,324,637 A | 4/1982 | Durai-swamy | |
| 4,324,641 A | 4/1982 | Durai-Swamy | |
| 4,324,642 A | 4/1982 | Durai-swamy | |
| 4,324,644 A | 4/1982 | Durai-swamy | |
| 4,325,327 A | 4/1982 | Kantesaria et al. | |
| 4,334,893 A | 6/1982 | Lang | |
| 4,336,128 A | 6/1982 | Tamm | |
| 4,341,598 A | 7/1982 | Green | |
| 4,344,770 A | 8/1982 | Capener et al. | |
| 4,364,796 A | 12/1982 | Ishii et al. | |
| 4,373,994 A | 2/1983 | Lee | |
| 4,375,950 A | 3/1983 | Durley | |
| 4,415,434 A | 11/1983 | Hargreaves et al. | |
| 4,422,927 A | 12/1983 | Kowalczyk | |
| 4,434,726 A | 3/1984 | Jones | |
| 4,443,229 A | 4/1984 | Sageman et al. | |
| 4,456,504 A | 6/1984 | Spars et al. | |
| 4,482,451 A | 11/1984 | Kemp | |
| 4,495,056 A | 1/1985 | Venardos et al. | |
| 4,504,379 A | 3/1985 | Stuntz et al. | |
| 4,537,571 A | 8/1985 | Buxel et al. | |
| 4,548,615 A | 10/1985 | Longchamp et al. | |
| 4,552,203 A | 11/1985 | Chrysostome et al. | |
| 4,574,743 A | 3/1986 | Claus | |
| 4,584,064 A | 4/1986 | Ciais et al. | |
| 4,584,947 A | 4/1986 | Chittick | |
| 4,595,567 A | 6/1986 | Hedrick | |
| 4,597,733 A | 7/1986 | Dean et al. | |
| 4,615,870 A | 10/1986 | Armstrong et al. | |
| 4,617,693 A | 10/1986 | Meyer et al. | |
| 4,645,568 A | 2/1987 | Kurps et al. | |
| 4,668,243 A | 5/1987 | Schulz | |
| 4,678,860 A | 7/1987 | Kuester | |
| 4,684,375 A | 8/1987 | Morin et al. | |
| 4,710,357 A | 12/1987 | Cetinkaya et al. | |
| 4,714,109 A | 12/1987 | Tsao | |
| 4,732,091 A | 3/1988 | Gould | |
| 4,796,546 A | 1/1989 | Herstad et al. | |
| 4,823,712 A | 4/1989 | Wormer | |
| 4,828,581 A | 5/1989 | Feldmann et al. | |
| 4,849,091 A | 7/1989 | Cabrera et al. | |
| 4,880,473 A | 11/1989 | Scott et al. | |
| 4,881,592 A | 11/1989 | Cetinkaya | |
| 4,891,459 A | 1/1990 | Knight et al. | |
| 4,897,178 A | 1/1990 | Best et al. | |
| 4,931,171 A | 6/1990 | Plotter | |
| 4,940,007 A | 7/1990 | Hiltunen et al. | |
| 4,942,269 A | 7/1990 | Chum et al. | |
| 4,968,325 A | 11/1990 | Black et al. | |
| 4,983,278 A | 1/1991 | Cha et al. | |
| 4,987,178 A | 1/1991 | Shibata et al. | |
| 4,988,430 A | 1/1991 | Sechrist et al. | |
| 4,992,605 A | 2/1991 | Craig et al. | |
| 5,009,770 A | 4/1991 | Miller et al. | |
| 5,011,592 A | 4/1991 | Owen et al. | |
| 5,018,458 A | 5/1991 | Mcintyre et al. | |
| 5,041,209 A | 8/1991 | Cha et al. | |
| 5,059,404 A | 10/1991 | Mansour et al. | |
| 5,077,252 A | 12/1991 | Owen et al. | |
| 5,093,085 A | 3/1992 | Engstrom et al. | |
| 5,136,117 A | 8/1992 | Paisley et al. | |
| 5,212,129 A | 5/1993 | Lomas | |
| 5,225,044 A | 7/1993 | Breu | |
| 5,236,688 A | 8/1993 | Watanabe et al. | |
| 5,239,946 A | 8/1993 | Garcia-Mallol | |
| 5,243,922 A | 9/1993 | Rehmat et al. | |
| 5,281,727 A | 1/1994 | Carver et al. | |
| 5,306,481 A | 4/1994 | Mansour et al. | |
| 5,326,919 A | 7/1994 | Paisley et al. | |
| 5,343,939 A | 9/1994 | Cetinkaya | |
| 5,371,212 A | 12/1994 | Moens | |
| 5,376,340 A | 12/1994 | Bayer et al. | |
| 5,380,916 A | 1/1995 | Rao | |
| 5,395,455 A | 3/1995 | Scott et al. | |
| 5,402,548 A | 4/1995 | Adair et al. | |
| 5,407,674 A | 4/1995 | Gabetta et al. | |
| 5,423,891 A | 6/1995 | Taylor | |
| 5,426,807 A | 6/1995 | Grimsley et al. | |
| 5,478,736 A | 12/1995 | Nair | |
| 5,494,653 A | 2/1996 | Paisley | |
| 5,516,279 A | 5/1996 | Yap | |
| 5,520,722 A | 5/1996 | Hershkowitz et al. | |
| 5,536,488 A | 7/1996 | Mansour et al. | |
| 5,578,092 A | 11/1996 | Collin | |
| 5,584,985 A | 12/1996 | Lomas | |
| 5,605,551 A | 2/1997 | Scott et al. | |
| 5,637,192 A | 7/1997 | Mansour et al. | |
| 5,654,448 A | 8/1997 | Pandey et al. | |

(56) References Cited

U.S. PATENT DOCUMENTS

| | | |
|---|---|---|
| 5,662,050 A | 9/1997 | Angelo et al. |
| 5,686,049 A | 11/1997 | Bonifay et al. |
| 5,703,299 A | 12/1997 | Carleton et al. |
| 5,713,977 A | 2/1998 | Kobayashi |
| 5,725,738 A | 3/1998 | Brioni et al. |
| 5,728,271 A | 3/1998 | Piskorz et al. |
| 5,744,333 A | 4/1998 | Cociancich et al. |
| 5,788,784 A | 8/1998 | Koppenhoefer et al. |
| 5,792,340 A | 8/1998 | Freel et al. |
| 5,853,548 A | 12/1998 | Piskorz et al. |
| 5,879,079 A | 3/1999 | Hohmann et al. |
| 5,879,642 A | 3/1999 | Trimble et al. |
| 5,879,650 A | 3/1999 | Kaul et al. |
| 5,904,838 A | 5/1999 | Kalnes et al. |
| 5,915,311 A | 6/1999 | Muller et al. |
| 5,961,786 A | 10/1999 | Freel et al. |
| 5,969,165 A | 10/1999 | Liu |
| 6,002,025 A | 12/1999 | Page et al. |
| 6,011,187 A | 1/2000 | Horizoe et al. |
| 6,033,555 A | 3/2000 | Chen et al. |
| 6,106,702 A | 8/2000 | Sohn et al. |
| 6,113,862 A | 9/2000 | Jorgensen et al. |
| 6,133,499 A | 10/2000 | Horizoe et al. |
| 6,149,765 A | 11/2000 | Mansour et al. |
| 6,190,542 B1 | 2/2001 | Comolli et al. |
| 6,193,837 B1 | 2/2001 | Agblevor et al. |
| 6,237,541 B1 | 5/2001 | Alliston et al. |
| 6,339,182 B1 | 1/2002 | Munson et al. |
| 6,497,199 B2 | 1/2002 | Yamada et al. |
| 6,398,921 B1 | 6/2002 | Moraski |
| 6,452,024 B1 | 9/2002 | Bui-Khac et al. |
| 6,455,015 B1 | 9/2002 | Kilroy |
| 6,485,841 B1 | 11/2002 | Freel et al. |
| 6,547,957 B1 | 4/2003 | Sudhakar et al. |
| 6,555,649 B2 | 4/2003 | Giroux et al. |
| 6,656,342 B2 | 12/2003 | Smith et al. |
| 6,660,157 B2 | 12/2003 | Que et al. |
| 6,676,828 B1 | 1/2004 | Galiasso et al. |
| 6,680,137 B2 | 1/2004 | Paisley et al. |
| 6,743,746 B1 | 6/2004 | Prilutsky et al. |
| 6,759,562 B2 | 7/2004 | Gartside et al. |
| 6,768,036 B2 | 7/2004 | Lattner et al. |
| 6,776,607 B2 | 8/2004 | Nahas et al. |
| 6,808,390 B1 | 10/2004 | Fung |
| 6,814,940 B1 | 11/2004 | Hiltunen et al. |
| 6,844,420 B1 | 1/2005 | Freel et al. |
| 6,875,341 B1 | 4/2005 | Bunger et al. |
| 6,960,325 B2 | 11/2005 | Kao et al. |
| 6,962,676 B1 | 11/2005 | Hyppaenen |
| 6,988,453 B2 | 1/2006 | Cole et al. |
| 7,004,999 B2 | 2/2006 | Johnson et al. |
| 7,022,741 B2 | 4/2006 | Jiang et al. |
| 7,026,262 B1 | 4/2006 | Palmas et al. |
| 7,202,389 B1 | 4/2007 | Brem |
| 7,214,252 B1 | 5/2007 | Krumm et al. |
| 7,226,954 B2 | 6/2007 | Tavasoli et al. |
| 7,240,639 B2 | 7/2007 | Hyppaenen et al. |
| 7,247,233 B1 | 7/2007 | Hedrick et al. |
| 7,262,331 B2 | 8/2007 | van de Beld et al. |
| 7,263,934 B2 | 9/2007 | Copeland et al. |
| 7,285,186 B2 | 10/2007 | Tokarz |
| 7,319,168 B2 | 1/2008 | Sanada |
| 7,473,349 B2 | 1/2009 | Keckler et al. |
| 7,476,774 B2 | 1/2009 | Umansky et al. |
| 7,479,217 B2 | 1/2009 | Pinault et al. |
| 7,491,317 B2 | 2/2009 | Meier et al. |
| 7,563,345 B2 | 7/2009 | Tokarz |
| 7,572,362 B2 | 8/2009 | Freel et al. |
| 7,572,365 B2 | 8/2009 | Freel et al. |
| 7,578,927 B2 | 8/2009 | Marker et al. |
| 7,625,432 B2 | 12/2009 | Gouman et al. |
| 7,811,340 B2 | 10/2010 | Bayle et al. |
| 7,897,124 B2 | 3/2011 | Gunnerman et al. |
| 7,905,990 B2 | 3/2011 | Freel |
| 7,943,014 B2 | 5/2011 | Berruti et al. |
| 7,956,224 B2 | 6/2011 | Elliott et al. |
| 7,960,598 B2 | 6/2011 | Spilker et al. |
| 7,982,075 B2 | 7/2011 | Marker et al. |
| 7,998,315 B2 | 8/2011 | Bridgwater et al. |
| 7,998,455 B2 | 8/2011 | Abbas et al. |
| 7,999,142 B2 | 8/2011 | Kalnes et al. |
| 7,999,143 B2 | 8/2011 | Marker et al. |
| 8,043,391 B2 | 10/2011 | Dinjus et al. |
| 8,057,641 B2 | 11/2011 | Bartek et al. |
| 8,097,090 B2 | 1/2012 | Freel et al. |
| 8,097,216 B2 | 1/2012 | Beech et al. |
| 8,147,766 B2 | 4/2012 | Spilker et al. |
| 8,153,850 B2 | 4/2012 | Hall et al. |
| 8,202,332 B2 | 6/2012 | Agblevor |
| 8,207,385 B2 | 6/2012 | O'Connor et al. |
| 8,217,211 B2 | 7/2012 | Agrawal et al. |
| 8,277,643 B2 | 10/2012 | Huber et al. |
| 8,288,600 B2 | 10/2012 | Bartek et al. |
| 8,304,592 B2 | 11/2012 | Luebke |
| 8,314,275 B2 | 11/2012 | Brandvold |
| 8,329,967 B2 | 12/2012 | Brandvold et al. |
| 8,404,910 B2 | 3/2013 | Kocal et al. |
| 8,499,702 B2 | 8/2013 | Palmas et al. |
| 8,519,203 B2 | 8/2013 | Marinangeli et al. |
| 8,519,205 B2 | 8/2013 | Frey et al. |
| 8,524,087 B2 | 9/2013 | Frey et al. |
| 8,575,408 B2 | 11/2013 | Marker et al. |
| 8,715,490 B2 | 5/2014 | Brandvold et al. |
| 8,726,443 B2 | 5/2014 | Freel et al. |
| 9,044,727 B2 | 6/2015 | Kulprathipanja et al. |
| 9,169,444 B2 | 10/2015 | Gosslink et al. |
| 2002/0014033 A1 | 2/2002 | Langer et al. |
| 2002/0100711 A1 | 8/2002 | Freel et al. |
| 2002/0146358 A1 | 10/2002 | Smith et al. |
| 2003/0049854 A1 | 3/2003 | Rhodes |
| 2003/0202912 A1 | 10/2003 | Myohanen et al. |
| 2004/0069682 A1 | 4/2004 | Freel et al. |
| 2004/0182003 A1 | 9/2004 | Bayle et al. |
| 2004/0200204 A1 | 10/2004 | Dries et al. |
| 2005/0167337 A1 | 8/2005 | Bunger et al. |
| 2005/0209328 A1 | 9/2005 | Allgcod et al. |
| 2006/0010714 A1 | 1/2006 | Carin et al. |
| 2006/0016723 A1 | 1/2006 | Tang et al. |
| 2006/0070362 A1 | 4/2006 | Dewitz et al. |
| 2006/0074254 A1 | 4/2006 | Zhang et al. |
| 2006/0101665 A1 | 5/2006 | Carin et al. |
| 2006/0147854 A1 | 7/2006 | Fullemann |
| 2006/0163053 A1 | 7/2006 | Ershag |
| 2006/0180060 A1 | 8/2006 | Grafton et al. |
| 2006/0185245 A1 | 8/2006 | Serio et al. |
| 2006/0201024 A1 | 9/2006 | Carin et al. |
| 2006/0254081 A1 | 11/2006 | Carin et al. |
| 2006/0264684 A1 | 11/2006 | Petri et al. |
| 2007/0000809 A1 | 1/2007 | Lin et al. |
| 2007/0010588 A1 | 1/2007 | Pearson |
| 2007/0141222 A1 | 6/2007 | Binder et al. |
| 2007/0205139 A1 | 9/2007 | Kulprathipanja et al. |
| 2007/0272538 A1 | 11/2007 | Satchell |
| 2008/0006519 A1 | 1/2008 | Badger |
| 2008/0006520 A1 | 1/2008 | Badger |
| 2008/0029437 A1 | 2/2008 | Umansky et al. |
| 2008/0035526 A1 | 2/2008 | Hedrick et al. |
| 2008/0035528 A1 | 2/2008 | Marker |
| 2008/0050792 A1 | 2/2008 | Zmierczak et al. |
| 2008/0051619 A1 | 2/2008 | Kulprathipanja et al. |
| 2008/0081006 A1 | 4/2008 | Myers et al. |
| 2008/0086937 A1 | 4/2008 | Hazlebeck et al. |
| 2008/0161615 A1 | 7/2008 | Chapus et al. |
| 2008/0171649 A1 | 7/2008 | Jan et al. |
| 2008/0185112 A1 | 8/2008 | Argyropoulos |
| 2008/0189979 A1 | 8/2008 | Carin et al. |
| 2008/0193345 A1 | 8/2008 | Lott et al. |
| 2008/0194896 A1 | 8/2008 | Brown et al. |
| 2008/0199821 A1 | 8/2008 | Nyberg et al. |
| 2008/0230440 A1 | 9/2008 | Graham et al. |
| 2008/0236043 A1 | 10/2008 | Dinjus et al. |
| 2008/0264771 A1 | 10/2008 | Dam-Johansen et al. |
| 2008/0274017 A1 | 11/2008 | Boykin et al. |
| 2008/0274022 A1 | 11/2008 | Boykin et al. |

(56) References Cited

U.S. PATENT DOCUMENTS

| | | |
|---|---|---|
| 2008/0282606 A1 | 11/2008 | Plaza et al. |
| 2008/0305445 A1 | 12/2008 | Roberts et al. |
| 2008/0312476 A1 | 12/2008 | McCall |
| 2008/0318763 A1 | 12/2008 | Anderson |
| 2009/0008292 A1 | 1/2009 | Keusenkothen et al. |
| 2009/0008296 A1 | 1/2009 | Sappok et al. |
| 2009/0077867 A1 | 3/2009 | Marker et al. |
| 2009/0077868 A1 | 3/2009 | Brady et al. |
| 2009/0078557 A1 | 3/2009 | Tokarz |
| 2009/0078611 A1 | 3/2009 | Marker et al. |
| 2009/0082603 A1 | 3/2009 | Kalnes et al. |
| 2009/0082604 A1 | 3/2009 | Agrawal et al. |
| 2009/0084666 A1 | 4/2009 | Agrawal et al. |
| 2009/0090046 A1 | 4/2009 | O'Connor et al. |
| 2009/0090058 A1 | 4/2009 | Dam-Johansen et al. |
| 2009/0113787 A1 | 5/2009 | Elliott et al. |
| 2009/0139851 A1 | 6/2009 | Freel |
| 2009/0165378 A1 | 7/2009 | Agblevor |
| 2009/0165435 A1 | 7/2009 | Koranek |
| 2009/0183424 A1 | 7/2009 | Gorbell et al. |
| 2009/0188158 A1 | 7/2009 | Morgan |
| 2009/0193709 A1 | 8/2009 | Marker et al. |
| 2009/0208402 A1 | 8/2009 | Rossi |
| 2009/0227823 A1 | 9/2009 | Huber et al. |
| 2009/0242377 A1 | 10/2009 | Honkola et al. |
| 2009/0250376 A1 | 10/2009 | Brandvold et al. |
| 2009/0253947 A1 | 10/2009 | Brandvold et al. |
| 2009/0253948 A1 | 10/2009 | McCall et al. |
| 2009/0255144 A1 | 10/2009 | Gorbell et al. |
| 2009/0259076 A1 | 10/2009 | Simmons et al. |
| 2009/0259082 A1 | 10/2009 | Deluga et al. |
| 2009/0274600 A1 | 11/2009 | Jain et al. |
| 2009/0283442 A1 | 11/2009 | McCall et al. |
| 2009/0287029 A1 | 11/2009 | Anumakonda et al. |
| 2009/0293344 A1 | 12/2009 | O'Brien et al. |
| 2009/0293359 A1 | 12/2009 | Simmons et al. |
| 2009/0294324 A1 | 12/2009 | Brandvold et al. |
| 2009/0301930 A1 | 12/2009 | Brandvold et al. |
| 2009/0308787 A1 | 12/2009 | O'Connor et al. |
| 2009/0318737 A1 | 12/2009 | Luebke |
| 2009/0321311 A1 | 12/2009 | Marker et al. |
| 2010/0043634 A1 | 2/2010 | Shulfer et al. |
| 2010/0083566 A1 | 4/2010 | Fredriksen et al. |
| 2010/0105970 A1 | 4/2010 | Yanik et al. |
| 2010/0133144 A1 | 6/2010 | Kokayeff et al. |
| 2010/0147743 A1 | 6/2010 | MacArthur et al. |
| 2010/0151550 A1 | 6/2010 | Nunez et al. |
| 2010/0158767 A1 | 6/2010 | Mehlberg et al. |
| 2010/0148122 A1 | 7/2010 | Breton et al. |
| 2010/0162625 A1 | 7/2010 | Mills |
| 2010/0163395 A1 | 7/2010 | Henrich et al. |
| 2010/0222620 A1 | 9/2010 | O'Connor et al. |
| 2010/0266464 A1 | 10/2010 | Sipila et al. |
| 2010/0325954 A1 | 12/2010 | Tiwari et al. |
| 2011/0017443 A1 | 1/2011 | Collins |
| 2011/0067438 A1 | 3/2011 | Bernasconi |
| 2011/0068585 A1 | 3/2011 | Dube et al. |
| 2011/0113675 A1 | 5/2011 | Fujiyama et al. |
| 2011/0123407 A1 | 5/2011 | Freel |
| 2011/0132737 A1 | 6/2011 | Jadhav |
| 2011/0139597 A1 | 6/2011 | Lin |
| 2011/0146135 A1 | 6/2011 | Brandvold |
| 2011/0146140 A1 | 6/2011 | Brandvold et al. |
| 2011/0146141 A1 | 6/2011 | Frey et al. |
| 2011/0146145 A1 | 6/2011 | Brandvold et al. |
| 2011/0160505 A1 | 6/2011 | McCall |
| 2011/0182778 A1 | 7/2011 | Breton et al. |
| 2011/0201854 A1 | 8/2011 | Kocal et al. |
| 2011/0224471 A1 | 9/2011 | Wormsbecher et al. |
| 2011/0239530 A1 | 10/2011 | Marinangeli et al. |
| 2011/0253600 A1 | 10/2011 | Niccum |
| 2011/0258914 A1 | 10/2011 | Banasiak et al. |
| 2011/0284359 A1 | 11/2011 | Sechrist et al. |
| 2012/0012039 A1 | 1/2012 | Palmas et al. |
| 2012/0017493 A1 | 1/2012 | Traynor et al. |
| 2012/0022171 A1 | 1/2012 | Frey |
| 2012/0023809 A1 | 2/2012 | Koch et al. |
| 2012/0047794 A1 | 3/2012 | Bartek et al. |
| 2012/0137939 A1 | 6/2012 | Kulprathipanja |
| 2012/0160741 A1 | 6/2012 | Gong et al. |
| 2012/0167454 A1 | 7/2012 | Brandvold et al. |
| 2012/0172622 A1 | 7/2012 | Kocal |
| 2012/0172643 A1 | 7/2012 | Ramirez Corredores et al. |
| 2012/0205289 A1 | 8/2012 | Joshi |
| 2012/0214114 A1 | 8/2012 | Kim et al. |
| 2012/0216448 A1 | 8/2012 | Ramirez Coredores et al. |
| 2012/0279825 A1 | 11/2012 | Freel et al. |
| 2012/0317871 A1 | 12/2012 | Frey et al. |
| 2013/0029168 A1 | 1/2013 | Trewella et al. |
| 2013/0062184 A1 | 3/2013 | Kulprathipanja et al. |
| 2013/0067803 A1 | 3/2013 | Kalakkunnath et al. |
| 2013/0075072 A1 | 3/2013 | Kulprathipanja et al. |
| 2013/0078581 A1 | 3/2013 | Kulprathipanja et al. |
| 2013/0212930 A1 | 3/2013 | Naae et al. |
| 2013/0105356 A1 | 5/2013 | Dijs et al. |
| 2013/0109765 A1 | 5/2013 | Jiang et al. |
| 2013/0118059 A1 | 5/2013 | Lange et al. |
| 2013/0145683 A1* | 6/2013 | Freel ............... C10L 1/1802 44/307 |
| 2013/0150637 A1 | 6/2013 | Borremans et al. |
| 2013/0152453 A1 | 6/2013 | Baird et al. |
| 2013/0152454 A1 | 6/2013 | Baird et al. |
| 2013/0152455 A1 | 6/2013 | Baird et al. |
| 2013/0195727 A1 | 8/2013 | Bull et al. |
| 2013/0267743 A1 | 10/2013 | Brandvold et al. |
| 2014/0001026 A1 | 1/2014 | Baird et al. |
| 2014/0140895 A1 | 5/2014 | Davydov et al. |
| 2014/0142362 A1 | 5/2014 | Davydov et al. |
| 2015/0005547 A1 | 1/2015 | Freel et al. |

FOREIGN PATENT DOCUMENTS

| | | |
|---|---|---|
| CA | 1312497 | 1/1993 |
| CA | 2091373 | 9/1997 |
| CA | 2299149 | 12/2000 |
| CA | 2521829 | 3/2006 |
| CN | 1377938 | 11/2002 |
| CN | 1730177 | 2/2006 |
| CN | 101045524 | 10/2007 |
| CN | 101238197 | 8/2008 |
| CN | 101294085 | 10/2008 |
| CN | 101318622 | 12/2008 |
| CN | 101353582 | 1/2009 |
| CN | 101365770 | 2/2009 |
| CN | 101381611 | 3/2009 |
| CN | 101544901 | 9/2009 |
| CN | 101550347 | 10/2009 |
| CN | 101745349 | 6/2010 |
| CN | 101993712 | 3/2011 |
| EP | 105980 | 1/1986 |
| EP | 578503 | 1/1994 |
| EP | 676023 | 7/1998 |
| EP | 718392 | 9/1999 |
| EP | 787946 | 6/2000 |
| EP | 1420058 | 5/2004 |
| EP | 2325281 | 5/2011 |
| FI | 117512 | 11/2005 |
| FR | 879606 | 3/1943 |
| GB | 1019133 | 2/1966 |
| GB | 1300966 | 12/1972 |
| JP | 58150793 | 9/1983 |
| JP | 1277196 | 11/1989 |
| JP | 11148625 | 6/1999 |
| JP | 2001/131560 | 5/2001 |
| JP | 2007/229548 | 9/2007 |
| JP | 2010091198 | 4/2010 |
| SE | 9903742-6 | 1/2004 |
| WO | 81/01713 | 6/1981 |
| WO | 1991/11499 | 8/1991 |
| WO | 1992/07842 | 5/1992 |
| WO | 1992/18492 | 10/1992 |
| WO | 1994/13827 | 6/1994 |
| WO | 1997/044410 | 11/1997 |
| WO | 2001/009243 | 2/2001 |

(56) References Cited

FOREIGN PATENT DOCUMENTS

| WO | 2001/83645 | 11/2001 |
|---|---|---|
| WO | 2002/49735 | 6/2002 |
| WO | 2006/071109 | 7/2006 |
| WO | 2007/017005 | 2/2007 |
| WO | 2007/045093 | 4/2007 |
| WO | 2007/050030 | 5/2007 |
| WO | 2007/112570 | 10/2007 |
| WO | 2007/128798 | 11/2007 |
| WO | 2008/009643 | 1/2008 |
| WO | 2008/020167 | 2/2008 |
| WO | 2008/092557 | 8/2008 |
| WO | 2009/019520 | 2/2009 |
| WO | 2009/047387 | 4/2009 |
| WO | 2009/047392 | 4/2009 |
| WO | 2009/067350 | 5/2009 |
| WO | 2009/099684 | 8/2009 |
| WO | 2009/118357 | 10/2009 |
| WO | 2009/118363 | 10/2009 |
| WO | 2009/126508 | 10/2009 |
| WO | 2009/131757 | 10/2009 |
| WO | 2010/002792 | 1/2010 |
| WO | 2011/146262 | 11/2011 |
| WO | 2012/009207 | 1/2012 |
| WO | 2012/012260 | 1/2012 |
| WO | 2012/062924 | 5/2012 |
| WO | 2012/078422 | 6/2012 |
| WO | 2012/088546 | 6/2012 |
| WO | 2012/115754 | 8/2012 |
| WO | 2013/043485 | 3/2013 |
| WO | 2013/090229 | 6/2013 |
| WO | 2014/031965 | 2/2014 |
| WO | 2014/210150 | 12/2014 |

OTHER PUBLICATIONS

Adam, J. "Catalytic conversion of biomass to produce higher quality liquid bio-fuels," *PhD Thesis*, Department of Energy and Process Engineering, The Norwegian University of Science and Technology, Trondheim (2005).

Adam, J. et al. "Pyrolysis of biomass in the presence of Al-MCM-41 type catalysts," *Fuel*, 84 (2005) 1494-1502.

Adjaye, John D. et al. "Catalytic conversion of a biomass-derived oil to fuels and chemicals I: Model compound studies and reaction pathways," *Biomass & Bioenergy*, 8:3 (1995) 131-149.

Adjaye, John D. et al. "Catalytic conversion of a biomass-derived oil to fuels and chemicals II: Chemical kinetics, parameter estimation and model predictions," *Biomass & Bioenergy*, 8:4 (1995) 265-277.

Adjaye, John D. et al. "Catalytic conversion of wood derived bio-oil to fuels and chemicals," *Studies in Surface Science and Catalysis*, 73 (1992) 301-308.

Adjaye, John D. et al. "Production of hydrocarbons by the catalytic upgrading of a fast pyrolysis bio-oil," *Fuel Process Technol*, 45:3 (1995) 161-183.

Adjaye, John D. et al. "Upgrading of a wood-derived oil over various catalysts," *Biomass & Bioenergy*, 7:1-6 (1994) 201-211.

Aho, A. et al. "Catalytic pyrolysis of woody biomass in a fluidized bed reactor; Influence of zeolites structure, Science Direct," *Fuel*, 87 (2008) 2493-2501.

Antonakou, E. et al. "Evaluation of various types of Al-MCM-41 materials as catalysts in biomass pyrolysis for the production of bio-fuels and chemicals," *Fuel*, 85 (2006) 2202-2212.

Atutxa, A. et al. "Kinetic Description of the Catalytic Pyrolysis of Biomass in a Conical Spouted Bed Reactor," *Energy Fuels*, 19:3 (2005) 765-774.

Baker, E. G. et al. "Catalytic Upgrading of Biomass Pyrolysis Oils," in Bridgwater, A. V. et al. (eds) *Research in Thermochemical Biomass Conversion*, Elsevier Science Publishers Ltd., Barking, England (1988) 883-895.

Baldauf, W. et al. "Upgrading of flash pyrolysis oil and utilization in refineries," *Biomass & Bioenergy*, 7 (1994) 237-244.

Baumlin, "The continuous self stirred tank reactor: measurement of the cracking kinetics of biomass pyrolysis vapours," *Chemical Engineering Science*, 60 (2005) 41-55.

Berg, "Reactor Development for the Ultrapyrolysis Process," *The Canadian Journal of Chemical Engineering*, 67 (1989) 96-101.

Bielansky, P. et al. "Catalytic conversion of vegetable oils in a continuous FCC pilot plant," *Fuel Processing Technology*, 92 (2011) 2305-2311.

Bimbela, F. et al. "Hydrogen production by catalytic steam reforming of acetic acid, a model compound of biomass pyrolysis liquids," *J. Ana App. Pyrolysis*, 79 (2007) 112-120.

Bridgwater et al. (eds) *Fast Pyrolysis of Biomass: A Handbook*, Newbury Cpl Press, Great Britain (2008) 1-13.

Bridgwater, A.V. "Principles and practices of biomass fast pyrolysis processes for liquids," *Journal of Analytical and Applied Pyrolysis*, 51 (1999) 3-22.

Bridgwater, Tony "Production of high grade fuels and chemicals from catalytic pyrolysis of biomass," *Catalysis Today*, 29 (1996) 285-295.

Bridgwater, Tony et al. "Transport fuels from biomass by thermal processing," *EU-China Workshop on Liquid Biofuels*, Beijing, China (Nov. 4-5, 2004).

Buchsbaum, A. et al. "The Challenge of the Biofuels Directive for a European Refinery," *OMW Refining and Marketing, ERTC 9th Annual Meeting*, Prague, Czech Republic (Nov. 15-17, 2004).

Carlson, T. et al. "Aromatic Production from Catalytic Fast Pyrolysis of Biomass-Derived Feedstocks," *Top Catal*, 52 (2009) 241-242.

Carlson., T. et al. "Green Gasoline by Catalytic Fast Pyrolysis of Solid Biomass Derived Compounds," *ChemSusChem*, 1 (2008) 397-400.

Cass et al. "Challenges in the Isolation of Taxanes from *Taxus canadensis* by Fast Pyrolysis," *J Analytical and Applied Pyrolysis* 57 (2001) 275-285.

Chantal, P. D. et al. "Production of Hydrocarbons from Aspen Poplar Pyrolytic Oils over H-ZSM5," *Applied Catalysis*, 10 (1984) 317-332.

Chen, N. Y. et al. "Fluidized Upgrading of Wood Pyrolysis Liquids and Related Compounds," in Soltes, E. J. et al. (eds) *Pyrolysis Oils from Biomass*, ACS, Washington, DC (1988) 277-289.

Chinsuwan, A. et al. "An experimental investigation of the effect of longitudinal fin orientation on heat transfer in membrane water wall tubes in a circulating ftuidized bed," *International Journal of Heat and Mass Transfer*, 52:5-6 (2009) 1552-1560.

Cornelissen, T. et al., "Flash co-pyrolysis of biomass with polylactic acid. Part 1: Influence on bio-oil yield and heating value," *Fuel* 87 (2008) 1031-1041.

Cousins, A. et al. "Development of a bench-scale high-pressure fluidized bed reactor and its sequential modification for studying diverse aspects of pyrolysis and gasification of coal and biomass," *Energy and Fuels*, 22:4 (2008) 2491-2503.

Cragg et al. "The Search for New Pharmaceutical Crops: Drug Discovery and Development at the National Cancer Institute," in Janick, J. and Simon, J.E. (eds) *New Crops*, Wiley, New York (1993) 161-167.

Czernik, S. et al. "Hydrogen from biomass-production by steam reforming of biomass pyrolysis oil," *Catalysis Today*, 129 (2007) 265-168.

Czernik, S. et al. "Hydrogren by Catalytic Steam Reforming of Liquid Byproducts from Biomass Thermoconversion Processes," *Ind. Eng. Chern. Res.*, 41 (2002) 4209-4215.

Dahmen, "Rapid pyrolysis for the pretreatment of biomass and generation of bioslurry as intermediate fuel", *Chemie-Ingenieur-Technik*, 79:9 (2007) 1326-1327. Language: German (Abstract only; Machine translation of Abstract).

Dandik, "Catalytic Conversion of Used Oil to Hydrocarbon Fuels in a Fractionating Pyrolysis Reactor," *Energy & Fuels*, 12 (1998) 1148-1152.

Daoust et al. "Canada Yew (*Taxus canadensis* Marsh.) and Taxanes: a Perfect Species for Field Production and Improvement through Genetic Selection," Natural Resources Canada, Canadian Forest Service, Sainte-Fov, Quebec (2003).

(56) References Cited

OTHER PUBLICATIONS de Wild, P. et al. "Lignin valorisation for chemicals and (transportation) fuels via (catalytic) pyrolysis and hydrodeoxygenation," *Environ. Prog, Sustainable Energy*, 28 (2009) 461-469.
Demirbas, Ayhan "Fuel Conversional Aspects of Palm Oil and Sunflower Oil," *Energy Sources*, 25 (2003) 457-466.
Di Blasi, C. et al. "Effects of Potassium Hydroxide Impregnation of Wood Pyrolysis, American Chemical Society," *Energy & Fuels* 23 (2009) 1045-1054.
Ellioti, D. "Historical Developments in Hydroprocessing Bio-oils," *Energy & Fuels*, 21 (2007) 1792-1815.
Ensyn Technologies Inc. "Catalytic de-oxygenation of biomass-derived RTP vapors." Prepared for ARUSIA, Agenzia Regionals Umbria per lo Sviluppo e L'Innovazione, Perugia, Italy (Mar. 1997).
Filtration, Kirk-Othmer Encyclopedia of Chemical Technology 5th Edition. vol. 11., John Wiley & Sons, Inc., Feb. 2005.
Gayubo, A. G. et al. "Deactivation of a HZSM-5 Zeolite Catalyst in the Transformation of the Aqueous Fraction of Biomass Pyrolysis Oil into Hydrocarbons," *Energy & Fuels*, 18:6 (2004) 1640-1647.
Gayubo, A. G. et al. "Undesired components in the transformation of biomass pyrolysis oil into hydrocarbons on an HZSM-5 zeolite catalyst," *J Chem Tech Biotech*, 80 (2005) 1244-1251.
Gevert, Börjie S. et al. "Upgrading of directly liquefied biomass to transportation fuels: catalytic cracking," *Biomass* 14:3 (1987) 173-183.
Goesele, W. et al., Filtration, Wiley-VCHVerlag GmbH & Co. KGaA, Weinheim, 10.1002/14356007.b02 10, 2005.
Grange, P. et al. "Hydrotreatment of pyrolysis oils from biomass: reactivity of the various categories of oxygenated compounds and preliminary techno-economical study," *Catalysis Today*, 29 (1996) 297-301.
Hama, "Biodiesel-fuel production in a packed-bed reactor using lipase-producing Rhizopus oryzae cells immobilized within biomass support particles", *Biochemical Engineering Journal*, 34 (2007) 273-278.
Hoekstra, E. et al., "Fast Pyrolysis of Biomass in a Fluidized Bed Reactor: In Situ Filtering of the Vapors," *Ind. Eng. Chern. Res.*, 48:10 (2009) 4744-4756.
Holton et al. "First Total Synthesis of Taxol. 2. Completion of the C and D Rings," *J Am Chem Soc*, 116 (1994) 1599-1600.
Horne, Patrick A. et al. "Catalytic coprocessing of biomass-derived pyrolysis vapours and methanol," *J. Analytical and Applied Pyrolysis*, 34:1 (1995) 87-108.
Horne, Patrick A. et al. "Premium quality fuels and chemicals from the fluidised bed pyrolysis of biomass with zeolite catalyst upgrading," *Renewable Energy*, 5:5-8 (1994) 810-812.
Horne, Patrick A. et al. "The effect of zeolite ZSM-5 catalyst deactivation during the upgrading of biomass-derived pyrolysis vapours," *J Analytical and Applied Pyrolysis*, 34:1 (1995) 65-85.
Huang et al. "New Taxanes from *Taxus brevifolia*," *J of Natural Products*, 49 (1986) 665-669.
Huffman, D. R. et al., Ensyn Technologies Inc., "Thermo-Catalytic Cracking of Wood to Transportation Fuels," DSS Contract No. 38SQ.23440-4-1429, Efficiency and Alternative Energy Technology Branch, Natural Resources Canada, Ottawa, Canada (1997).
Huffman, D. R., Ensyn Technologies Inc., "Thermo-catalytic cracking of wood to transportation fuels using the RTP process," DSS Contract No. 38SQ.23440-4-1429, Efficiency and Alternative Energy Technology Branch, Natural Resources Canada, Ottawa, Ontario (Jan. 1997).
Hughes, J. et al. "Structural variations in natural F, OH and CI apatites," *American Mineralogist*, 74 (1989) 870-876.
Huie, C. W. "A review of modern sample-preparation techniques for the extraction and analysis of medicinal plants," *Anal Bioanal Chem*, 373 (2002) 23-30.
International Search Report dated Feb. 22, 2013 for corresponding International Application No. PCT/US2012/68876.
Ioannidou, "Investigating the potential for energy, fuel, materials and chemicals production from corn residues (cobs and stalks) by non-catalytic and catalytic pyrolysis in two reactor configurations," *Renewable and Sustainable Energy Reviews*, 13 (2009) 750-762.
Iojoiu, E. et al. "Hydrogen production by sequential cracking of biomass-derived pyrolysis oil over noble metal catalysts supported on ceria-zirconia," *Applied Catalysis A: General*, 323 (2007) 147-161.
Jackson, M. et al. "Screening heterogenous catalysts for the pyrolysis of lignin," *J. Anal. Appl. Pyrolysis*, 85 (2009) 226-230.
Junming et al. "Bio-oil upgrading by means of ethyl ester production in reactive distillation to remove water and to improve storage and fuel characteristics," *Biomass and Energy*, 32 (2008) 1056-1061.
Kalnes, Tom et al. "Feedstock Diversity in the Refining Industry," UOP Report to NREL and DOE (2004).
Khanal, "Biohydrogen Production in Continuous-Flow Reactor Using Mixed Microbial Culture," *Water Environment Research*, 78:2 (2006) 110-117.
Khimicheskaya Entsiklopediya. Pod red. N. S. Zefirov. Moskva, Nauchnoe Izdatelstvo "Bolshaya Rossyskaya Entsiklopediya", 1995, p. 133-137,529-530.
Kingston et al. "New Taxanes from *Taxus brevifolia*," *J of Natural Products*, 45 (1982) 466-470.
Lappas, A. A. et al. "Biomass pyrolysis in a circulating fluid bed reactor for the production of fuels and chemicals," *Fuel*, 81 (2002) 2087-2095.
Lappas, A.A. et al. "Production of Transportation Fuels from Biomass," *Workshop of Chemical Process Engineering Research Institute/Center for Research and Technology Hellas*, Thermi-Thessaloniki, Greece (2004).
Lappas, A.A., "Production of biofuels via co-processing in conventional refining process," *Catalysis Today*, 145 (2009) 55-62.
Maiti, R.N. et al. "Gas-liquid distributors for trickle-bed reactors: A review"; *Industrial and Engineering Chemistry Research*, 46:19 (2007) 6164-6182.
Mancosky, "The use of a controlled cavitation reactor for bio-diesel production," (abstract only), AIChE Spring National Meeting 2007, Houston, Texas.
Marker, Terry L., et al. "Opportunities for Biorenewables in Petroleum Refineries," Proceedings of the 230th ACS National Meeting, Washington, DC, Paper No. 125, Fuel Division (Aug. 31, 2005) (abstract only).
Marker, Terry L., et al., UOP, "Opportunities for Biorenewables in Oil Refineries," Final Technical Report, U.S. Department of Energy Award No. DE-FG36-05G015085, Report No. DOEGO15085Final (2005).
Marquevich, "Hydrogen from Biomass: Steam Reforming of Model Compounds of Fast-Pyrolysis Oil," *Energy & Fuels*, 13 (1999) 1160-1166.
Masoumifard, N. et al. "Investigation of heat transfer between a horizontal tube and gas-solid fluidized bed," *International Journal of Heat and Fluid Flow*, 29:5 (2008) 1504-1511.
McLaughlin et al. 19-Hydroxybaccatin III, 10-Deacetylcephalo-Mannine, and 10-Deacetyltaxol: New Anti-Tumor Taxanes from *Taxus wallichiana*, *J of Natural Products*, 44 (1981) 312-319.
McNeil "Semisynthetic Taxol Goes on Market Amid Ongoing Quest for New Versions," *J of the National Cancer Institute*, 87:15 (1995) 1106-1108.
Meier, D. et al. "State of the art of applied fast pyrolysis of lignocellulosic materials—a review," *Bioresource Technology*, 68:1 (1999) 71-77.
Meier, D. et al., "Pyrolysis and Hydroplysis of Biomass and Lignins—Activities at the Institute of Wood Chemistry in Hamburg, Germany," vol. 40, No. 2, Preprints of Papers Presented at the 209th ACS National Meeting, Anaheim, CA (Apr. 2-7, 1995).
Mercader, F. et al. "Pyrolysis oil upgrading by high pressure thermal treatment," *Fuel*, 89:10 (2010) 2829-2837.
Miller et al. "Antileukemic Alkaloids from *Taxus wallichiana* Zucc," *J Org Chem*, 46 (1981) 1469-1474.
Mohan, D. et al. "Pyrolysis of Wood/Biomass for Bio-oil: A Critical Review," *Energy Fuels*, 20:3 (2006) 848-849.
Newton "Taxol: A Case Study in Natural Products Chemistry," Lecture Notes, University of Southern Maine, http:/www.usm.maine.edu/ (2009) 1-6.

(56) References Cited

OTHER PUBLICATIONS

Nicolaou et al. "Total Synthesis of Taxol," *Nature*, 367 (1994) 630-634.
Nowakowski, D. et al. "Potassium catalysis in the pyrolysis behaviour of short rotation willow coppice," *Fuels*, 86 (2007) 2389-2402.
Ognisty, T. P. "The direct contact heat transfer performance of a spray nozzle, a notched through distributor, and two inch Pall rings," AlChE 1990 Spring National Meeting (Orlando Mar. 18-22, 1990) Preprint N. 37c 36P, Mar. 18, 1990.
Ohman "Bed Agglomeration Characteristics during Fluidized Bed Combustion of Biomass Fuels," *Energy & Fuels*, 14 (2000) 169-178.
Okumura, Y. et al. "Pyrolysis and gasification experiments of biomass under elevated pressure condition," Nihon Kikai Gakkai Ronbunshu, B Hen/Transactions of the Japan Society of Mechanical Engineers, Part B, vol. 73, No. 7, 2007, pp. 1434-1441.
Olazar, M. et al. "Pyrolysis of Sawdust in a Conical Spouted-Bed Reactor with a HZSM-5 Catalyst," *AlChE Journal*, 46:5 (2000) 1025-1033.
Onay "Influence of pyrolysis temperature and heating rate on the production of bio-oil and char from safflower seed by pyrolysis, using a well-swept fixed-bed reactor," *Fuel Processing Technology*, 88 (2007) 523-531.
Onay, "Production of Bio-Oil from Biomass: Slow Pyrolysis of Rapeseed (*Brassica napus* L.) in a Fixed-Bed Reactor," *Energy Sources*, 25 (2003) 879-892.
Ong et al. "Pressurized hot water extraction of bioactive or marker compounds in botanicals and medicinal plant materials," *J Chromatography A*, 1112 (2006) 92-102.
Ooi, Y. S. et al. "Catalytic Cracking of Used Palm Oil and Palm Oil Fatty Acids Mixture for the Production of Liquid Fuel: Kinetic Modeling." *J Am Chem Soc*, 18 (2004) 1555-1561.
Otterstedt, J. E. et al. "Catalytic Cracking of Heavy Oils," in Occelli, Mario L. (ed) Fluid Catalytic Cracking, Chapter 17, ACS, Washington, DC (1988) 266-278.
Padmaja, K.V. et al. "Upgrading of Candelilla biocrude to hydrocarbon fuels by fluid catalytic cracking," *Biomass and Bioenergy*, 33 (2009) 1664-1669.
Pavia et al., Intro to Org Labo Techniques (1988) 3d ed. Saunders College Publishing, Washington p. 62-66, 541-587.
PCT/US2012/055384 International Search Report, dated Mar. 28, 2013, and International Preliminary Report on Patentability, dated Mar. 25, 2014.
Pecora, A.A.B. et al., "Heat transfer coefficient in a shallow fluidized bed heat exchanger with a continuous flow of solid particles," *Journal of the Brazilian Society of Mechanical Sciences and Engineering*, 28:3 (2006) 253-258.
Pecora, A.A.B., et al., "An analysis of process heat recovery in a gas-solid shallow fluidized bed," *Brazilian Journal of Chemical Engineering*, 23:4 (2006) 497-506.
Petrik, P.T. et al. "Heat exchange in condensation of R227 coolant on inclined tubes placed in a granular BED," *Journal of Engineering Physics and Thermophysics*, 77:4 (2004) 758-761.
Prasad Y. S. et al. "Catalytic conversion of canola oil to fuels and chemical feedstocks. Part II. Effect of co-feeding steam on the performance of HZSM-5 catalyst," *Can J Chem Eng*, 64 (1986) 285-292.
Prins, Wolter et al. "Progress in fast pyrolysis technology," *Topsoe Catalysis Forum 2010*, Munkerupgaard, Denmark (Aug. 19-20, 2010).
Radlein, D. et al. "Hydrocarbons from the Catalytic Pyrolysis of Biomass," *Energy & Fuels*, 5 (1991) 760-763.
Rao "Taxol and Related Taxanes. I. Taxanes of *Taxus brevifolia* Bark," *Pharm Res* 10:4 (1993) 521-524.
Rao et al. "A New Large-Scale Process for Taxol and Related Taxanes from *Taxus brevifolia*," *Pharm Res*, 12:7 (1995) 1003-1010.
Ravindranath, G., et al., "Heat transfer studies of bare tube bundles in gas-solid fluidized bed", 9th International Symposium on Fluid Control Measurement and Visualization 2007, FLUCOME 2007, vol. 3, 2007, pp. 1361-1369.
Rodriguez, O.M.H. et al. "Heat recovery from hot solid particles in a shallow fluidized bed," *Applied Thermal Engineering*, 22:2 (2002) 145-160.
Samolada, M. C. et al. "Production of a bio-gasoline by upgrading biomass flash pyrolysis liquids via hydrogen processing and catalytic cracking," *Fuel*, 77:14 (1998) 1667-1674.
Sang "Biofuel Production from Catalytic Cracking of Palm Oil," *Energy Sources*, 25 (2003) 859-869.
Scahill, J. et al. "Removal of Residual Char Fines from Pyrolysis Vapors by Hot Gas Filtration," in Bridgwater, A. V. et al. (eds) *Developments in Thermochemical Biomass Conversion*, Springer Science+Business Media, Dordrecht (1997) 253-266.
Scott, D. et al. Pretreatment of poplar wood for fast pyrolysis: rate of cation removal, *Journal of Analytical and Applied Pyrolysis*, 57 (2000) 169-176.
Senilh et al. "Mise en Evidence de Nouveaux Analogues du Taxol Extraits de *Taxus baccata*," *J of Natural Products*, 47 (1984) 131-137. (English Abstract included).
Sharma, R. "Upgrading of pyrolytic lignin fraction of fast pyrolysis oil to hydrocarbon fuels over HZSM-5 in a dual reactor system," *Fuel Processing Technology*, 35 (1993) 201-218.
Sharma, R. K. et al. "Catalytic Upgrading of Pyrolysis Oil," *Energy & Fuels*, 7 (1993) 306-314.
Sharma, R. K. et al. "Upgrading of wood-derived bio-oil over HZSM-5," *Bioresource Technology*, 35:1 (1991) 57-66.
Smith R.M. "Extractions with superheated water," *J Chromatography A*, 975 (2002) 31-46.
Snader "Detection and Isolation," in Suffness, M. (ed) *Taxol-Science and Applications*, CRC Press, Boca Raton, Florida (1995) 277-286.
Srinivas, S.T. et al "Thermal and Catalytic Upgrading of a Biomass-Derived Oil in a Dual Reaction System," *Can. J. Chem. Eng.*, 78 (2009) 343-354.
Stierle et al. "The Search for Taxol-Producing Microorganism Among the Endophytic Fungi of the Pacific Yew, *Taxus brevifolia*," *J of Natural Products*, 58 (1995) 1315-1324.
Stojanovic, B. et al. "Experimental investigation of thermal conductivity coefficient and heat exchange between fluidized bed and inclined exchange surface," *Brazilian Journal of Chemical Engineering*, 26:2 (2009) 343-352.
Sukhbaatar, B. "Separation of Organic Acids and Lignin Fraction From Bio-Oil and Use of Lignin Fraction in Phenol-Formaldehyde Wood Adhesive Resin," *Master's Thesis*, Mississippi State (2008).
Twaiq, A. A. et al. "Performance of composite catalysts in palm oil cracking for the production of liquid fuels and chemicals," *Fuel Processing Technology*, 85 (2004) 1283-1300.
Twaiq, F. A. et al. "Liquid hydrocarbon fuels from palm oil by catalytic cracking over aluminosilicate mesoporous catalysts with various Si/Al ratios," *Microporous and Mesoporous Materials*, 64 (2003) 95-107.
Tyson, K. et al. "Biomass Oil Analysis: Research Needs and Recommendations," National Renewable Energy Laboratory, Report No. NREL/TP-510-34796 (Jun. 2004).
Valle, B. et al. "Integration of Thermal Treatment and Catalytic Transformation for Upgrading Biomass Pyrolysis Oil," *International Journal of Chemical Reactor Engineering*, 5:1 (2007).
Vasanova, L.K. "Characteristic features of heat transfer of tube bundles in a cross water-air flow and a three-phase fluidized bed," *Heat Transfer Research*, 34:5-6 (2003) 414-420.
Vitolo, S. et al. "Catalytic upgrading of pyrolytic oils over HZSM-5 zeolite: behaviour of the catalyst when used in repeated upgrading—regenerating cycles," *Fuel*, 80 (2001) 17-26.
Vitolo, S. et al. "Catalytic upgrading of pyrolytic oils to fuel over different zeolites," *Fuel*, 78:10 (1999) 1147-1159.
Wang, Xianhua et al., "The Influence of Microwave Drying on Biomass Pyrolysis," *Energy & Fuels* 22 (2008) 67-74.
Westerhof, Roel J. M. et al., "Controlling the Water Content of Biomass Fast Pyrolysis Oil," *Ind. Eng. Chem. Res.* 46 (2007) 9238-9247.

(56) References Cited

OTHER PUBLICATIONS

Williams, Paul T. et al. "Characterisation of oils from the fluidised bed pyrolysis of biomass with zeolite catalyst upgrading," *Biomass and Bioenergy*, 7:1-6 (1994) 223-236.

Williams, Paul T. et al. "Comparison of products from the pyrolysis and catalytic pyrolysis of rice husks," *Energy*, 25:6 (2000) 493-513.

Williams, Paul T. et al. "The influence of catalyst type on the composition of upgraded biomass pyrolysis oils," *J Analytical and Applied Pyrolysis*, 31 (1995) 39-61.

Yukimune et al. "Methyl Jasmonate-induced Overproduction of Paclitaxel and Baccatin III in Taxus Cell Suspension Cultures," *Nature Biotechnology* 14 (1996) 1129-1132.

Zhang et al. "Investigation on initial stage of rapid pyrolysis at high pressure using Taiheiyo coal in dense phase," *Fuel*, 81:9 (2002) 1189-1197.

Zhang, "Hydrodynamics of a Novel Biomass Autothermal Fast Pyrolysis Reactor: Flow Pattern and Pressure Drop," *Chem. Eng. Technol.*, 32:1 (2009) 27-37.

Graham, R.G. et al. "Thermal and Catalytic Fast Pyrolysis of Lignin by Rapid Thermal Processing (RPT)," Seventh Canadian Bioenergy R&D Seminar, Skyline Hotel, Ottawa, Ontario, Canada, Apr. 24-26, 1989.

Wisner, R. "Renewable Identification Numbers (RINs) and Government Biofuels Blending Mandates," *AgMRC Renewable Energy Newsletter* (Apr. 2009), available at http://www.agmrc.org/renewable_energy/biofuelsbiorefining_general/renewable-identification-numbers-rins-and-government-biofuels-blending-mandates/.

Qi et al. "Review of biomass pyrolysis oil properties and upgrading research," *Energy Conversion & Management*, 48 (2007) 87-92.

Office Action, U.S. Appl. No. 14/346,517, dated Sep. 25, 2015, available at www.uspto.gov.

Yoo et al. "Thermo-mechanical extrusion pretreatment for conversion of soybean hulls to fermentable sugars," *Bioresource Technology*, 102 (2011) 7583-7590.

Search Report, Intellectual Property Office of Singapore, dated Jun. 4, 2015, for corresponding SG 11201403208Y.

Written Opinion, Intellectual Property Office of Singapore, dated Jul. 31, 2015, for corresponding SG 11201403208Y.

Supplemental European Search Report, dated Sep. 4, 2015, for corresponding EP 12858367.1.

Fogassy, G. et al., "Biomass derived feedstock co-processing with vacuum gas oil for second-generation fuel production in FCC units," *Applied Catalysis B: Environmental*, 96:3-4 (2010) 476-485.

Gutierrez et al., "Co-Processing of Upgraded Bio-Liquids in Standard Refinery Units-Fundamentals," $15^{th}$ European Biomass Conference & Exhibition, Berlin, May 7-11 (2007).

Mercader, "Pyrolysis Oil Upgrading for Co-Processing in Standard Refinery Units," Ph.D. Thesis, University of Twente (2010).

Samolada, M.C. et al., "Catalyst Evaluation for Catalytic Biomass Pyrolysis," *Energy & Fuels*, 14:6 (2000) 1161-1167.

International Search Report dated Nov. 4, 2016 for corresponding PCT/US2016/047777.

Written Opinion dated Nov. 4, 2016 for corresponding PCT/US2016/047777.

European Search Report dated Mar. 22, 2019 issued in European Application No. 16839882.4.

\* cited by examiner

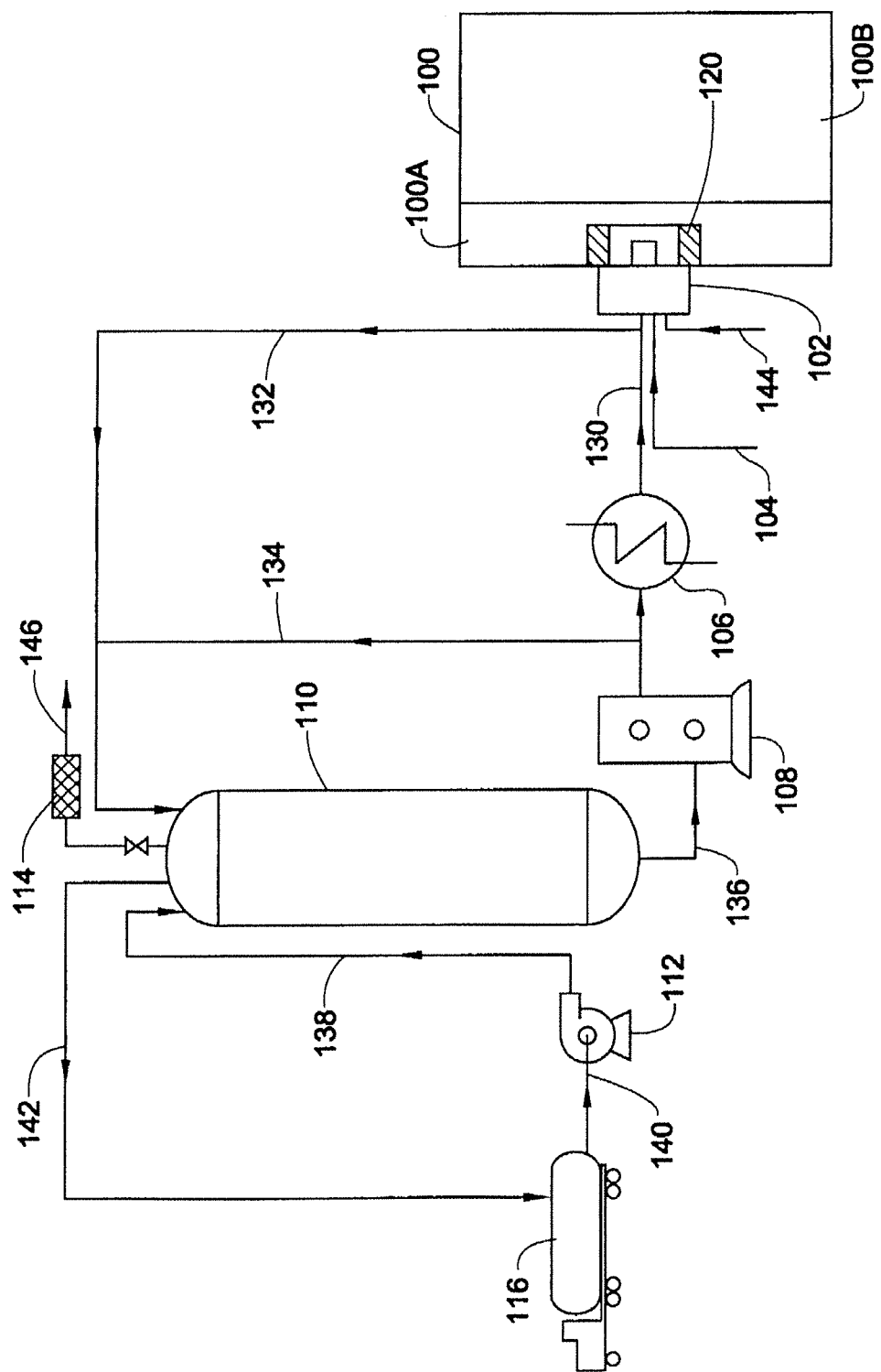

LIQUID BIOMASS HEATING SYSTEM

CROSS REFERENCE TO RELATED APPLICATIONS

This application claims the benefit of priority from both U.S. Provisional Patent Application No. 62/208,351, filed on Aug. 21, 2015, and U.S. Provisional Patent Application No. 62/220,785 filed on Sep. 18, 2015. All of the foregoing related applications, in their entirety, are incorporated herein by reference.

FIELD OF THE INVENTION

The present disclosure generally relates to the introduction of a renewable fuel or renewable oil as a heating oil or fossil fuel substitute for use in boilers or thermal applications. More specifically, the present disclosure is directed to systems, methods, and apparatuses utilizing a liquid thermally produced from biomass into commercial and industrial boiler or thermal systems such as boilers, furnaces, and kilns, and methods for generating renewable identification numbers (RINs), alternative energy credits (AECs) and renewable energy credits (RECs). An aspect of this application and the various inventive embodiments herein are systems, methods, and fuels that are compliant with one or more of the various thermal energy credit programs enabling the combustion of unenriched renewable fuel oil, derived from biomass, to additionally earn thermal energy credits, for example, C-RINs, RINs, ACPs. RECs as well as others.

BACKGROUND

Biomass has been a primary source of energy over much of human history. During the late 1800's and 1900's the proportion of the world's energy sourced from biomass dropped, as the commercial development and utilization of fossil fuels occurred, and markets for coal and petroleum products dominated. Nevertheless, some 15% of the world's energy continues to be sourced from biomass, and in developing countries the contribution of biomass is much higher at 38%. In addition, there has been a new awareness of the impact of the utilization of fossil fuels on the environment. In particular, the contribution of greenhouse gases, as a result of consuming fossil fuels.

Biomass, such as wood, wood residues, and agricultural residues, can be converted to useful products, e.g., fuels or chemicals, by thermal or catalytic conversion. An example of thermal conversion is pyrolysis where the biomass is converted to a liquid and char, along with a gaseous co-product by the action of heat in essentially the absence of oxygen.

In a generic sense, pyrolysis is the conversion of biomass to a liquid and/or char by the action of heat, typically without involving any significant level of direct combustion of the biomass feedstock in the primary conversion unit.

Historically, pyrolysis was a relatively slow process where the resulting liquid product was a viscous tar and "pyroligneous" liquor. Conventional slow pyrolysis has typically taken place at temperatures below 400° C., and over long processing times ranging from several seconds to minutes or even hours with the primary intent to produce mainly charcoal and producing liquids and gases as by-products.

A more modern form of pyrolysis, or rapid thermal conversion, was discovered in the late 1970's when researchers noted that an extremely high yield of a light, pourable liquid was possible from biomass. In fact, liquid yields approaching 80% of the weight of the input of a woody biomass material were possible if conversion was allowed to take place over a very short time period, typically less than 5 seconds.

The homogeneous liquid product from this rapid pyrolysis, which has the appearance of a light to medium petroleum fuel oil, is a renewable fuel oil. In particular, the renewable fuel oil may be an unenriched renewable fuel oil, formed from a biomass comprising cellulosic material, wherein the only processing of the biomass may be a therma-mechanical process (specifically comprising grinding and rapid thermal processing, with no post or further catalytic processing, hydrogenation, or enrichment or other chemical upgrading of the liquid prior to its use as a combustion or renewable fuel).

In practice, the short residence time pyrolysis of biomass causes the major part of its organic material to be instantaneously transformed into a vapor phase. This vapor phase contains both non-condensable gases (including methane, hydrogen, carbon monoxide, carbon dioxide and olefins) and condensable vapors. It is the condensable vapors that constitute the final liquid product, when condensed and recovered, and the yield and value of this liquid is a strong function of the method and efficiency of the downstream capture and recovery system.

Given the fact that there is a limited availability of hydrocarbon crude and an ever increasing demand for energy, particularly liquid transportation fuels, alternative sources are therefore required. The abundance and sustainability of biomass makes renewable feedstock an attractive option to supplement the future demand for petroleum. The difficulty with biomass is the fact that it contains oxygen, unlike conventional hydrocarbon fuels, and historically has not been readily convertible into a form that can be easily integrated into existing hydrocarbon based infrastructure. In particular, utilization of unenriched pyrolysis oil as a heating oil or fossil fuel substitute has been limited due to its lower energy density, lower combustion temperature, relative thermal instability, corrosiveness, and limited miscibility with traditional heating oil or fossil fuels.

The lower energy density, lower combustion temperature, and poor thermal stability of unenriched pyrolysis oil are attributable in part to high water content (typically >20 wt. %) and the presence of oxygenated hydrocarbons (typically >40 wt. %). The oxygenated compounds, including carboxylic acids, phenols, cresols, and aldehydes, tend to undergo secondary reactions during storage, resulting in increased viscosity, phase separation and/or solids formation. Additionally, pyrolysis oil contains char and alkali metal contaminants which appear to catalyze these secondary reactions, further contributing to the stability problems.

As a result of the stability problems, storage of pyrolysis oil for use as a heating oil or fossil fuel substitute in combustion systems can be problematic. In particular, viscosity changes can occur at ambient storage temperature and may accelerate at higher temperatures. Moreover, rapid temperature changes can lead to phase separation of the pyrolysis oil into an aqueous-rich phase and an aqueous deficient phase. These changes may render the pyrolysis oil unsuitable for handling in conventional or existing fossil fuel-based infrastructure and equipment, including pumps, vessels, and boiler systems.

The corrosiveness and limited miscibility of pyrolysis oil are due largely to its acidity and its high moisture and oxygen contents. Pyrolysis oil typically has a pH<3 and a TAN>150, making it corrosive to storage, pipes, existing fossil fuel-based infrastructure and equipment, including pumps, vessels, and boiler systems. In addition, the presence of char and alkali metals contribute to ash formation during combustion of pyrolysis oil. As a result, unenriched pyrolysis oil is not immediately compatible with existing liquid and/or fossil fuel-based infrastructure as a heating oil or fossil fuel substitute.

Upgrading pyrolysis oil to overcome the foregoing difficulties has proven to be a difficult challenge. The use of catalytic cracking of a solid or liquid biomass, a biomass-derived vapor, or a thermally-produced liquid as a means to produce hydrocarbons from oxygenated biomass is technically complex, relatively inefficient, and produces significant amounts of low value byproducts. To solve the catalyst and yield issues, researchers looked at stand-alone upgrading pathways where biomass-derived liquids could be converted to liquid hydrocarbons using hydrogen addition and catalyst systems in conversion systems that were tailored specifically for the processing of oxygenated materials (Elliott, *Historical Developments in Hydroprocessing Bio-oils*, Energy & Fuels 2007, 21, 1792-1815). Although technically feasible, the large economies-of-scale and the technical complexities and costs associated with high-pressure multi-stage hydrogen addition (required for complete conversion to liquid hydrocarbon fuels) are severely limiting and generally viewed as unacceptable. Other approaches such as liquid-liquid extraction, or gasification face similar hurdles, significantly reducing the economic competitiveness of pyrolysis oil as a petroleum substitute.

New approaches are needed to circumvent the foregoing limitations. One innovative embodiment that forms part of the present application is a method of maintaining and handling an unenriched renewable fuel oil for use as a heating oil or fossil fuel substitute in a thermal system. Applicable thermal systems include a boiler, a furnace, a kiln, and an evaporative cooling system.

BRIEF SUMMARY OF THE INVENTION

Another innovative embodiment that forms part of the present application is a boiler comprising a dual-purpose or dual-fuel burner system with a post-combustion purge system capable of utilizing an unenriched renewable fuel oil. In an embodiment, the dual-purpose or dual-fuel burner is controllable to allow combustion or firing of either heating oil no. 4, a fossil fuel, or an unenriched renewable fuel oil at the appropriate fuel-to-air ratios and volumetric flow rates. The post-combustion purge system removes uncombusted unenriched renewable fuel oil from the vicinity of the burner, eliminating the presence of fuel when the burner is shut down. As set forth in the present disclosure, unexpected technical and economic benefits may be gained in the use of unenriched renewable fuel oil as a heating oil or fossil fuel substitute in commercial and industrial boilers.

In certain embodiments, the invention relates to a method of combustion, comprising burning two different fuels (for example, a heating fuel oil and an unenriched renewable fuel oil) in a burner. In certain embodiments, the burner may be an element of a boiler, a furnace, a kiln, or an evaporative cooling system. In certain embodiments, the invention relates to a method of combustion, comprising burning a first fuel in a burner at a temperature of 1,900° C. to 2,300° C. with an atomized fuel-to-air ratio of 0.8:1 to 5:1 and burning a second fuel in the burner at a temperature of 1,300° C. to 1,800° C. with an atomized fuel to air ratio of 0.4:1 to 4:1. In certain embodiments, the invention relates to a method of combustion, comprising burning a first fuel having an adiabatic flame temperature of 1,900° C. to 2,300° C. in a burner with an fuel-to-air ratio of 0.8:1 to 5:1 and burning a second fuel having an adiabatic flame temperature of 1,300° C. to 1,800° C. in the burner with an fuel to air ratio of 0.4:1 to 4:1. In certain embodiments, the invention relates to a method of combustion, comprising burning a first fuel in a burner with an adiabatic flame temperature of 1,900 to 2,300° C. and a fuel-to-air ratio resulting in 1%, 2%, 3%, 4%, or between 2% and 4% oxygen in the combustion flue gas, and burning a second fuel in the burner with an adiabatic flame temperature at least 300° C. below that of the first fuel and an fuel-to-air ratio resulting in 1%, 2%, 3%, 4%, or between 2% and 4% oxygen in the combustion flue gas produced by combustion of the second fuel.

In certain embodiments, the invention relates to a method of combustion comprising burning two different fuels, wherein the first fuel is a petroleum-based heating fuel oil (for example a no. 2, no. 4, no. 6 or waste oil) and the second fuel is an unenriched renewable fuel oil. In certain embodiments, the invention relates to a method of combustion comprising burning two different fuels, wherein the volume ratio of the first fuel and the second fuel is in the range of 1:1.5 to 1:2.5, for example 1:1.5 to 1:2.

In certain embodiments, the invention relates to a method of utilizing a renewable fuel oil in a burner or thermal system. In certain embodiments, the thermal system comprises a boiler, a furnace, a kiln, and/or an evaporative cooling system. In certain embodiments, the invention relates to a method of utilizing an unenriched renewable fuel oil in a boiler, comprising maintaining the unenriched renewable fuel oil at a suitable temperature, preventing the unenriched renewable fuel oil from undergoing phase separation, conversion and/or decomposition, and storing the prepared unenriched renewable fuel oil for limited periods, for example less than six months, less than three months, less than one month, less than two weeks, or less than one week. In certain embodiments, the invention relates to a method of utilizing an unenriched renewable fuel oil in a heating oil boiler, comprising maintaining the unenriched renewable fuel oil at a suitable temperature, preventing the unenriched renewable fuel oil from undergoing phase separation, and storing the prepared unenriched renewable fuel oil for less than six months. In certain embodiments, the invention relates to a method of utilizing an unenriched renewable fuel oil in a fossil fuel-fired or petroleum-based heating oil boiler, comprising maintaining the unenriched renewable fuel oil at a suitable temperature, preventing the unenriched renewable fuel oil from undergoing phase separation, and storing the prepared unenriched renewable fuel oil for less than six months, less than three months, less than one month, less than two weeks, or less than one week. In certain embodiments, the invention relates to a method of utilizing an unenriched renewable fuel oil in a fossil fuel-fired boiler, comprising maintaining the unenriched renewable fuel oil at a suitable temperature, preventing the unenriched renewable fuel oil from undergoing phase separation, and storing the prepared unenriched renewable fuel oil for less than six months, less than three months, less than one month, less than two weeks, or less than one week. In certain embodiments, the invention relates to a method of utilizing an unenriched renewable fuel oil in a petroleum-based heating fuel oil-fired boiler, comprising maintaining the unenriched renewable fuel oil at a suitable temperature, preventing the unenriched renewable fuel oil from undergoing phase separation, and storing the prepared unenriched renewable fuel oil for less than one month, wherein the unenriched renewable fuel oil has a water content of less than 30 wt. %, for example 25 wt. % and an ash content of less than 3 wt. % or 0.25 wt. %. In certain embodiments, the invention relates to a method of utilizing a renewable fuel oil in a burner with a water content in the range of 20 wt. % to 25 wt. % and an ash content of less than 0.25 wt. %, for example less than 0.15 wt. %, less than 0.1 wt. %, or less than 0.07 wt. %.

In certain embodiments, the invention relates to a method of utilizing a renewable fuel oil in a boiler or thermal system, comprising providing a supply of the unenriched renewable fuel oil at a temperature of between 15° C. and 30° C., for example between 15° C. and 25° C., pre-heating the unenriched renewable fuel oil to a temperature of between 50° C. and 80° C., for example between 50° C. and 70° C., and pumping the pre-heated unenriched renewable fuel oil to the boiler or thermal system for combustion. In certain embodiments, the thermal system comprises a boiler, a furnace, a kiln, or an evaporative cooling system. In certain embodiments, the invention relates to a method of utilizing an unenriched renewable fuel oil in a petroleum-based or fossil fuel-based or heating oil boiler comprising use of the unenriched renewable fuel oil in place of petroleum-based fuel or a fossil fuel, for example a heating fuel oil. In certain embodiments, the invention relates to a method of utilizing an unenriched renewable fuel oil in a petroleum-based or fossil fuel-based heating fuel oil boiler, comprising providing a BTU or energy-equivalent supply of the unenriched renewable fuel oil at a temperature of between 15° C. and 30° C., for example between 15° C. and 25° C., pre-heating the unenriched renewable fuel oil to a temperature of between 50° C. and 80° C., for example between 50° C. and 70° C., and pumping the pre-heated unenriched renewable fuel oil to the boiler or a burner for combustion. In certain embodiments, the invention relates to a method of utilizing an unenriched renewable fuel oil in a no. 4 heating oil boiler or burner comprising use of the unenriched renewable fuel oil in place of heating oil no. 4 or a fossil fuel. In certain embodiments, the invention relates to a method of utilizing an unenriched renewable fuel oil at greater than 70%, greater than 80%, greater than 90%, greater than 95%, or greater than 98% of the maximum firing rate of the fossil fuel-based boiler expressed as millions of British Thermal Units per hour (MMBtu/hr).

In certain embodiments, the invention relates to systems and methods utilizing a renewable fuel oil in place of heating oil in a boiler or fossil fuel in a thermal system. In certain embodiments, the thermal system comprises a boiler, a furnace, a kiln, and/or an evaporative cooling system. In certain embodiments, the invention relates to systems and methods to utilize an unenriched renewable fuel oil in place of heating fuel oil in a commercial or industrial boiler. In certain embodiments, the invention relates to systems to utilize an unenriched renewable fuel oil in place of heating fuel oil in a boiler, the system comprising a self-contained storage tank comprising a conservation valve equipped with an activated carbon filter, a positive displacement pump in fluid contact with the storage tank, an external heat exchanger whose inlet is in fluid contact with the pump, the external heat exchanger heating the renewable fuel oil to a specified temperature, a temperature control valve whose inlet is in fluid contact with the heat exchanger and whose outlet is in fluid contact with the storage tank, a temperature control system which maintains the storage tank at a steady state temperature by controlling the temperature control valve and/or the heat exchanger, a fuel delivery train in fluid contact with the external heat exchanger which receives a portion of the unenriched renewable fuel oil, the fuel delivery train comprising a startup/shutdown by-pass line in fluid contact with the storage tank, and a boiler system comprising a burner, the burner in fluid contact with the fuel delivery train.

In certain embodiments, the invention relates to a boiler with a dual-fuel boiler or dual-fuel burner capable of combusting at least two fuels, for example a petroleum-based fuel and a biomass-derived fuel. In certain embodiments, the dual-fuel boiler may be capable of combusting a renewable fuel oil. In certain embodiments, the dual-fuel boiler may be capable of combusting an unenriched renewable fuel oil. In certain embodiments, the invention relates to a dual-fuel boiler capable of combusting a petroleum-based heating fuel oil and an unenriched renewable fuel oil. In certain embodiments, the dual-fuel boiler comprises a burner capable of combusting two or more fuels, for example a petroleum-based heating fuel oil and an unenriched renewable fuel oil.

In certain embodiments, the burner may comprise an atomization assembly capable of atomizing a first and second fuel, for example by mixing with an atomizing gas such as air or steam. In certain embodiments, the burner may be capable of being controlled at least two pre-determined combustion air and atomization gas flow rates.

In certain embodiments, the burner comprises a restart element to restart combustion if a flameout occurs. In certain embodiments, the restart element comprises one or more radiant and/or thermally reflective surfaces. In certain embodiments, the restart element comprises a refractory, ceramic, or metal component positioned proximate the pre-determined flame zone for the second fuel.

In certain embodiments, the boiler comprises a post-combustion purge system to remove residual fuel in the burner during and/or after termination of combustion.

In certain embodiments, the boiler comprises a firetube boiler. In certain embodiments, the firetube boiler comprises a soot blowing system. In certain embodiments the soot blowing system provides pulses of compressed air to the fire tubes of the firetube boiler on a pre-determined schedule. In certain embodiments, the pulses of compressed air are in the direction of flow of combustion flue gas. In certain embodiments, the soot blower comprises a compressed air source, a manifold adjacent an end plate of the firetube boiler in fluid communication with the compressed air source, and a plurality of lances in fluid communication with the manifold, wherein the lances are situated proximate a plurality of the fire tube openings.

In certain embodiments, the invention relates to a method of combustion comprising forming a spray cone comprising an atomized renewable fuel oil. In certain embodiments, the renewable fuel oil is an unenriched renewable fuel oil. In certain embodiments, the spray cone may further comprise a second liquid biofuel. In certain embodiments, the second liquid biofuel is selected from a group consisting of methanol and ethanol. In certain embodiments, the spray cone may further comprise an oxygen-containing gas. In certain embodiments, the oxygen-containing gas is air.

In certain embodiments, forming the atomized renewable fuel oil comprises raising the temperature of a renewable fuel oil to between 50° C. and 80° C. for no more than a limited period of time. In certain embodiments, the limited period of time is 30 seconds, 15 seconds, 10 seconds, 5 seconds, or 1 second. In certain embodiments, the spray cone is formed inside a thermal system. In certain embodiments, the spray cone is formed inside the fire box of a boiler. In certain embodiments, the spray cone is formed in a furnace or a kiln.

In certain embodiments, the spray cone may be proximate a radiant surface at a temperature sufficient to promote vaporization and/or ignition of the atomized renewable fuel oil. In certain embodiments, the spray cone may be proximate a thermally reflective surface. In certain embodiments, the radiant and/or thermally reflective surface is a portion of the surface of a refractory sleeve. In certain embodiments, the refractory sleeve is an assembly of refractory bricks. In certain embodiments, the assembly of refractory bricks is cylindrical. In certain embodiments, the radiant and/or thermally reflective surface is a portion of the surface of a burner block. In certain embodiments, the burner block has a cylindrical orifice. In certain embodiments, the burner block is extended in the direction of flow of the spray cone. In certain embodiments, the atomized renewable fuel oil is combusted a flame zone of a combustion chamber proximate a heat sink situated in the combustion chamber. In certain embodiments, the flame zone is a pre-determined flame zone. In certain embodiments, the heat sink is in thermal communication with the radiant and/or thermally reflective surface such that combustion heat is delivered to the heat sink and the heat sink delivers heat to the radiant surface. In certain embodiments, the thermally reflective surface reflects heat generated in the flame zone to heat the spray cone. In certain embodiments, the radiant and/or thermally reflective surface and the heat sink together comprise a metal cylinder, refractory sleeve, or a burner block. In certain embodiments, the radiant and/or thermally reflective surface and the heat sink are of a single construct. In certain embodiments, the radiant and/or thermally reflective surface and the heat sink are separate constructs.

In certain embodiments, the atomized renewable fuel oil is combusted in a flame zone of a combustion chamber to produce a combustion flue gas. In certain embodiments, the combustion flue gas comprises approximately 3% oxygen.

In certain embodiments, the invention relates to a dual-fuel boiler or dual-fuel burner system comprising a first fuel feed train and a second fuel feed train. In certain embodiments, the second fuel feed train may comprise a recycle loop for pre-heating the second fuel prior to combustion and for maintaining consistent temperature of the second fuel stored in a storage tank. In certain embodiments, first fuel feed train and a second fuel feed train terminate at a common fuel gun. In certain embodiments, the first fuel and the second fuel are directed to a common burner nozzle. In certain embodiments, the invention relates to a first fuel consisting of a heating fuel oil (for example, heating fuel oil no. 4) and a second fuel consisting of a renewable fuel oil.

In certain embodiments, the invention relates to a method to reduce greenhouse gas emissions from a boiler or thermal system by replacing a petroleum-based or fossil fuel with a biomass-derived fuel. In certain embodiments, the thermal system comprises a boiler, a kiln, a furnace, or an evaporative cooling system. In certain embodiments, the method to reduce greenhouse gas emissions comprises reducing gas emissions by collecting vapors displaced from a fuel storage tank and sequestering them in a tanker truck. In certain embodiments, the method to reduce greenhouse gas emissions comprises combustion of a renewable fuel oil. In certain embodiments, the method to reduce greenhouse gas emissions comprises maintaining the stability of the renewable fuel oil by storing at a consistent temperature. In certain embodiments, the method to reduce greenhouse gas emissions comprises pre-heating the renewable fuel oil prior to combustion so that the renewable fuel oil will have the proper viscosity for use in a conventional boiler system.

In certain embodiments, the invention relates to a method of reducing greenhouse gas emissions from a commercial or industrial boiler or thermal system, comprising providing a series of tanker truck shipments containing an unenriched renewable fuel oil at a temperature with less than 3° C. variability between shipments. In certain embodiments, the invention relates to a method of reducing greenhouse gas emissions from a commercial or industrial boiler, comprising providing a tanker truck shipments containing an unenriched renewable fuel oil with a water content of less than 25 wt. % that varies less than 3% between shipments.

In certain embodiments, the invention relates to a method of combustion which reduces the generation of thermally-produced nitrogen oxides ($NO_x$) (i.e., NO produced by the reaction of nitrogen present in a combustion air stream) in comparison with combustion of one or more petroleum fuels, comprising burning a renewable fuel oil (RFO) fuel in a burner with an adiabatic flame temperature at least 300° C. below that of the petroleum fuel. In certain embodiments, the renewable fuel oil (RFO) is an unenriched renewable fuel oil. In certain embodiments, the unenriched renewable fuel oil has a water content of between 20 wt. % and 26 wt. %. In certain embodiments, the unenriched renewable fuel oil has an adiabatic flame temperature of 1,300 to 1,800° C.

In certain embodiments, the invention relates to a method of limiting emissions of at least one component of a combustion flue gas stream formed by combustion in a burner, comprising estimating cumulative emissions for a selected time interval of at least one component of a combustion flue gas stream, and, if the estimated cumulative emissions exceeds a pre-determined limit prior to a pre-determined time, switching the burner from combustion of a first fuel to a second fuel. In certain embodiments, the first fuel is a fossil fuel and the second fuel is a renewable fuel oil. In certain embodiments, the first fuel is a renewable fuel oil and the second fuel is a fossil fuel. In certain embodiments, the at least one component of the combustion flue gas is a sulfur oxide ($SO_x$), a nitrogen oxide ($NO_x$), a greenhouse gas, carbon monoxide (CO), or particulate matter (PM).

In certain embodiments, the invention relates to a method to obtain one or more U.S. cellulosic-renewable identification numbers, renewable energy credits, or alternative energy credits by replacing a petrochemical or fossil fuel with a liquid biomass in a combustion system. In certain embodiments, the displaced petrochemical or fossil fuel is a heating fuel oil. In certain embodiments, the liquid biomass is an unenriched renewable fuel oil. In certain embodiments, the liquid biomass is substituted for the petrochemical or fossil fuel on a BTU or energy-equivalent basis. In certain embodiments, the liquid biomass is pre-heated to adjust the viscosity to more closely conform to the viscosity of the displaced petrochemical fuel. In certain embodiments, a tanker truck captures and sequesters vapors displaced from the liquid biomass storage tank during recharging.

In certain embodiments, the invention relates to a method to obtain one or more U.S. cellulosic-renewable identification numbers or renewable energy credits, comprising supplying a D7-compliant unenriched renewable fuel oil comprising less than 25 wt. % or less than 30 wt. % water and less than 0.1% or less than 0.25% ash to a storage tank via tanker truck delivery, the storage tank in communication with a commercial or industrial boiler.

In certain embodiments, the invention relates to a method of trading U.S. renewable identification numbers, renewable energy credits, or alternative energy credits comprising combusting a renewable fuel oil in place of a fossil fuel in a boiler or burner, obtaining one or more U.S. renewable identification numbers, renewable energy credits, or alternative energy credits for the replacement of the fossil fuel by the renewable fuel oil, and transferring the rights of at least a portion of the one or more U.S. renewable identification numbers, renewable energy credits, or alternative energy credits. In certain embodiments, the invention relates to a method of trading U.S. renewable identification numbers, comprising combusting a D7-compliant unenriched renewable fuel oil in place of a fossil fuel in a commercial or industrial boiler or burner, the unenriched renewable fuel oil comprising less than 25% or less than 30% water and less than 0.1% or less than 0.25% ash and that been preheated from a temperature in the range of 15° C. to 30° C., for example in the range of 15° C. to 25° C., to a temperature in the range of 50° C. to 80° C., for example in the range of 50° C. to 70° C., obtaining one or more U.S. renewable identification numbers for the replacement of the fossil fuel by the D7-compliant unenriched renewable fuel oil, and transferring the rights of at least a portion of the one or more U.S. renewable identification numbers.

In certain embodiments, the invention relates to a boiler fuel supply comprising a renewable fuel oil. In certain embodiments, the invention relates to a boiler fuel supply comprising an unenriched renewable fuel oil, the invention comprising more than one shipment via one or more tanker trucks in a one-week, two-week, one-month, two-month, three-month, or six-month period delivered to a storage tank in communication with a commercial or industrial boiler, wherein the temperature, water, and ash content are kept relatively consistent between any two of the shipments. In certain embodiments, the invention relates to a supply of unenriched renewable fuel oil, comprising more than one shipment via one or more tanker trucks in a six-month period delivered to a storage tank in communication with a commercial or industrial boiler, each tanker truck maintaining the unenriched renewable fuel oil at a constant temperature in the range of 15° C. to 30° C., for example 20° C. to 25° C., 20 wt. % to 30 wt. % water content, for example 20 wt. % to 25 wt. %, less than 0.25 wt. % ash, for example less than 0.07 wt. % ash, less than 15° C. variation in temperature between any two of the shipments, for example less than 3° C. variation in temperature between any two of the shipments, and less than 5% variation in the water content between any two of the shipments.

DETAILED DESCRIPTION OF THE DRAWINGS

Many of the benefits of the materials, systems, methods, products, uses, and applications among others may be readily appreciated and understood from consideration of the description and details provided in this application inclusive of the accompanying drawings and abstract, wherein:

FIG. 1 illustrates a representative renewable fuel oil heating system.

DETAILED DESCRIPTION

In 2005, the Environmental Protection Agency (EPA) released its Renewable Fuel Standards (RFS), which were the first renewable fuel mandates in the United States. The RFS called for 7.5 B gallons of renewable fuel to be blended into gasoline by 2012. Two years later, the program was expanded under the Energy Independence and Security Act of (EISA) of 2007 to target 36 B gallons of renewable fuel by 2022. In addition, EISA expanded the RFS to cover diesel fuels as well as gasoline (jet fuels were not initially included under RFS) and established individual volume targets for the different types of renewable fuel (e.g., RFS2 calls for 21 B gallons of advanced biofuels by 2022).

Cellulosic biofuels falling under RFS2 include diesel fuels, jet fuels, and heating oils. Due to the lack of commercial cellulosic facilities in the U.S., the EPA conducts an annual review of total cellulosic capacity to evaluate the feasibility of its production targets and subsequently makes adjustments. The EPA has proposed cellulosic volumes of up to 12.9M gallons (up to 15.7M gallons on an ethanol equivalent basis) for 2012, well below its original 500M gallon target. Significant progress must be made in facilitating the scale-up of cellulosic technologies in order for the U.S. to meet the 16 B gallon production target for cellulosic fuels by 2022.

Part of the regulations include an incentive program that provides for an award of Renewable Identification Numbers (RIN) for the utilization in combustion of bio-fuels produced in accordance with certain pathways that are designed to be environmentally less harmful than the traditional methods of producing fuels. Among the several approved pathways, there are some related to the use of cellulosic containing biomass (cellulosic biomass) that can earn Cellulosic Renewable Identification Numbers (C-RIN's).

As of 2014, 31 states had some form of Renewable Portfolio Standard (RPS) and/or Alternative Energy Portfolio Standards (APS). A RPS or APS require that obligated parties (normally electric utilities) have a certain percentage of their electricity come from renewable and alternative resources. The Northeastern United States (including New York) has led the way with what are generally accepted to be the most stringent and aggressive standards.

Traditionally, RPS/APS requirements have only pertained to electric generators, though that is beginning to change. In 2013, New Hampshire passed a law that provided for a renewable thermal carve-out under their RPS. The rules became effective this year. In July of 2014, Massachusetts added renewable thermal technologies to the APS2. The Massachusetts law went into effect on Jan. 1, 2015. A number of other states are seriously considering renewable thermal provisions, as well. This includes Maine, Connecticut, and Rhode Island, in which legislations has been proposed, and New York, in which the Public Utilities Commission can enact renewable thermal provisions without legislation.

In both Massachusetts and New Hampshire, obligated parties can comply with their applicable law in one of two ways: they can either buy Alternative Compliance Payments (ACPs) or buy the credits generated by the renewable thermal generators. In New Hampshire, the ACP is set at $25/MWh (2013 dollars) and escalates with inflation. This equates to about $7.33/MMBtu. In Massachusetts, the ACP for 2014 was $21.72 and also increases with inflation. This equates to about $6.37/MMBtu.

In both Massachusetts and New Hampshire, the value of the credits is highly correlated to the ACP. This is due to the fact that the statutory requirement of the obligated parties (i.e., the demand) far exceeds the supply of the credits available to the marketplace.

Suitable biomass, biomass materials, or biomass components, include but are not limited to, wood, wood residues, sawdust, slash bark, thinnings, forest cullings, begasse, corn fiber, corn stover, empty fruit bunches (EFB), fronds, palm fronds, flax, straw, low-ash straw, energy crops, palm oil, non-food-based biomass materials, crop residue, slash, precommercial thinnings and tree residue, annual covercrops, switchgrass, *miscanthus*, cellulosic containing components, cellulosic components of separated yard waste, cellulosic components of separated food waste, cellulosic components of separated municipal solid waste (MSW), or combinations thereof. Cellulosic biomass, for example, includes biomass derived from or containing cellulosic materials. For example, the biomass may be one characterized as being compliant with U.S. renewable fuel standard program (RFS) regulations, or a biomass suitable for preparing a cellulosic-renewable identification number-compliant fuel. In certain embodiments, the biomass may be characterized as being compliant with those biomass materials specified in the pathways for a D-code 1, 2, 3, 4, 5, 6, or 7-compliant fuel, in accordance with the U.S. renewable fuel standard program (RFS) regulations. For example, the biomass may be characterized as being compliant with those biomass materials suitable for preparing a D-code 7-compliant fuel, in accordance with the U.S. renewable fuel standard program (RFS).

One aspect of the current application may be to earn Cellulosic Renewable Identification Numbers (C-RINs) through the importation or production of a D-code 7-compliant unenriched renewable fuel oil and subsequent use as a heating fuel oil in heating systems (e.g., in boilers, furnaces, and kilns) to displace use of traditional fossil fuel-based heating fuel oils (e.g., heating fuel oil no. 2 or no. 4).

One aspect of the current application may be to earn Renewable Energy Credits (RECs) through the importation or production of unenriched renewable fuel oil and subsequent use in boilers to displace use of traditional heating fuel oils.

A method of operating an industrial boiler having individually or collectively one or more (inclusive of all) of the various embodiment herein described, comprising: combusting an unenriched renewable fuel oil and generating (or earning) a thermal energy credit.

An industrial boiler (inclusive of dual-purpose and/or dual-fuel boilers) having individually or collectively one or more (inclusive of all) of the various embodiment herein described, comprising: a burner for combusting an unenriched renewable fuel oil and generating (or earning) a thermal energy credit.

An unenriched renewable heating oil (or renewable fuel oil) prepared in accordance with one or more of the governing standards for achieving thermal energy credits, wherein the renewable heating oil is derived from biomass. This unenriched renewable heating oil may be used in one or more of the various methods, systems, and/or boilers (inclusive of dual-purpose and/or dual-fuel boilers).

One aspect of the current application may be to earn Alternative Energy Credits (AECs) through the importation or production of unenriched renewable fuel oil and subsequent use in boilers to displace use of traditional heating fuel oils.

A renewable fuel oil (also referred to herein as "RFO") refers to a biomass-derived fuel oil or a fuel oil prepared from the conversion of biomass. For example, in certain embodiments, the renewable fuel oil may be a cellulosic renewable fuel oil (also referred to herein as "cellulosic RFO"), and may be derived or prepared from the conversion of cellulosic-containing biomass. The biomass or cellulosic-containing biomass may be converted to form a suitable renewable fuel, by one or more of the following processes: thermal conversion, thermo-mechanical conversion, thermo-catalytic conversion, or catalytic conversion of the biomass or cellulosic-containing biomass. In certain embodiments, the renewable fuel oil may be non-hydrodeoxygenated (non-HDO), non-deoxygenated, non-upgraded, thermally-processed, rapid thermally-processed, thermo-mechanically-processed, rapid thermo-mechanically-processed, non-hydrotreated, conditioned, and/or combinations thereof. For example, the renewable fuel oil may be non-hydrodeoxygenated (non-HDO) renewable fuel oil; a non-HDO, non-deoxygenated renewable fuel oil; a rapid thermo-mechanically-processed, non-hydrotreated renewable fuel oil; or a non-deoxygenated, non-upgraded, thermally-processed renewable fuel oil. A further example of a suitable renewable fuel oil may be a non-hydrodeoxygenated, non-deoxygenated, non-hydrotreated, non-upgraded, non-catalytically processed, thermo-mechanically-processed renewable fuel oil which would be understood to mean a renewable fuel oil that may be derived from simply mechanically grinding a biomass, for example a cellulosic biomass, and then thermally processing the ground biomass, for example rapidly, to derive a liquid with no further processing steps to substantially alter the oxygen content, the water content, the sulfur content, the nitrogen content, the solids content or otherwise enrich the renewable fuel oil for processing into a fuel. Additionally, this non-hydrodeoxygenated, non-deoxygenated, non-hydrotreated, non-upgraded, non-catalytically processed, thermo-mechanically-processed renewable fuel oil could be blended with other batches of non-hydrodeoxygenated, non-deoxygenated, non-hydrotreated, non-upgraded, non-catalytically processed, thermo-mechanically-processed renewable fuel oil and/or other non-hydrodeoxygenated, non-deoxygenated, non-hydrotreated, non-upgraded, non-catalytically processed, thermo-mechanically-processed renewable fuel oil that have been derived from other biomass to form blends of non-hydrodeoxygenated, non-deoxygenated, non-hydrotreated, non-upgraded, non-catalytically processed, thermo-mechanically-processed renewable fuel oil.

In particular, the renewable fuel oil may be an unenriched renewable fuel oil: a liquid formed from a biomass comprising cellulosic material, wherein the only processing of the biomass may be a therma-mechanical process (specifically comprising grinding and rapid thermal processing, with no post processing, further catalytic processing, hydrogenation, enrichment of the liquid or other chemical upgrading prior to introduction into petroleum conversion unit). Specifically, no hydrodeoxygenation, no hydrotreating, no catalytic exposure or contact or processing just unenriched renewable fuel oil derived by thermo-mechanically processing cellulosic containing biomass.

A preferred renewable fuel oil may be an unenriched liquid (also referred to as an unenriched renewable fuel oil) formed from ground-up biomass by a process, for example rapid thermal processing, wherein the resulting liquid may be at least 50 wt. %, for example at least 60 wt. %, at least 70 wt. %, at least 75 wt. %, at 80 wt. % or at least 85 wt. % of the total weight of the processed biomass. In other words the liquid yield from the processed biomass may be at least 50 wt. %, for example at least 60 wt. %, at least 70 wt. %, at least 75 wt. %, at 80 wt. % or at least 85 wt. % of the total weight of the ground biomass being processed. Unenriched should be understood to refer to renewable fuel oil liquid that does not undergo any further pre- or post-processing including, specifically, no hydrodeoxygenation, no hydrotreating, no catalytic exposure or contact or processing. In certain embodiments, unenriched renewable fuel oil may be prepared from the ground biomass and then transported and/or stored, and may be even heated or maintained at a given temperature; not exceeding 150° F. The mechanical handling associated with transporting, storing, heating, and/or pre-heating of the unenriched renewable fuel oil is not considered an enriching step. In certain embodiments, an unenriched renewable fuel oil may comprise one or more unenriched renewable fuels oils mixed from separate unenriched batches and/or unenriched batches resulting from different cellulosic biomass (for example, several different types of non-food biomass). In certain embodiments, these mixed compositions, which may be blended to purposefully provide or achieve certain characteristics in the combined unenriched renewable fuel oil, may still be considered unenriched renewable fuel oil provided that substantially all (for example greater than 80 wt. %, or greater than 90 wt. % such as greater than 95 wt. % or greater than 98 wt. % or greater than 99 wt. %) or all of the combined batches are unenriched renewable fuel oil.

A preferred renewable fuel oil may be a non-HDO renewable fuel oil; a non-HDO, non-deoxygenated renewable fuel oil; a rapid thermo-mechanically-processed, non-hydrotreated renewable fuel oil; or a non-deoxygenated, non-upgraded, thermally-processed renewable fuel oil.

For example, the renewable fuel oil may comprise only thermally converted biomass or only thermo-mechanically converted biomass. Suitable renewable fuel oils may include a pyrolytic liquid, a thermo-pyrolytic liquid, a thermo-mechanical-pyrolytic liquid, a rapid thermo-pyrolytic liquid, or a rapid thermo-pyrolytic-mechanical liquid, derived or prepared from the conversion of biomass or cellulosic biomass. In certain embodiments, the renewable fuel oil may include a non-hydrodeoxygenated (non-HDO) renewable fuel oil; a non-deoxygenated renewable fuel oil; a non-upgraded renewable fuel oil; a thermally-processed cellulosic renewable fuel oil; a thermally-processed, non-upgraded-cellulosic renewable fuel oil; a thermally-processed biomass liquid; a thermally-processed, non-upgraded-biomass liquid; a thermally processed non-food-based biomass liquid; a thermally-processed non-food, cellulosic-based biomass liquid; a thermally-processed non-food, renewable liquid; a thermally-processed cellulosic liquid; a rapid thermal-processed cellulosic liquid; a rapid thermal-processed bio-oil; a rapid thermal processed biomass liquid or thermo-pyrolytic liquid having less than 5 wt. % solid content, such as less than 4 wt. %, 3 wt. %, 2.5 wt. %, 2 wt. %, 1 wt. %, or less than 0.5 wt. % solid content; a conditioned renewable fuel oil; a non-hydrotreated, non-upgraded renewable fuel oil; a pyrolysis oil or pyrolytic liquid; a thermo-pyrolysis oil or a thermo-pyrolytic liquid; a bio-oil or a bio-oil liquid; a biocrude oil or biocrude liquid; a thermo-catalytic pyrolysis oil or a thermo-catalytic pyrolytic oil; a catalytic pyrolysis oil; a catalytic pyrolytic liquid; or combinations thereof. For example, in certain embodiments, the renewable fuel oil may comprise one or more of a non-hydrodeoxygenated (non-HDO) renewable fuel oil; a non-deoxygenated renewable fuel oil; a non-upgraded renewable fuel oil; a thermally-processed cellulosic renewable fuel oil; a rapid thermo-mechanically-processed renewable fuel oil; a non-hydrotreated, non-upgraded renewable fuel oil; a pyrolysis oil or pyrolytic liquid; or a thermo-pyrolysis oil or a thermo-pyrolytic liquid.

In certain embodiments, the thermal conversion process of forming a suitable unenriched renewable fuel oil from biomass may include, for example, rapid thermal conversion processing. In certain embodiments, the mechanical aspect of the conversion process (sometimes referred to herein as "conditioning"), of forming a suitable renewable fuel oil from biomass may include, but may be not limited to drying; grinding; removing fines; removing tramp metal; sizing; removing ferrous metals; removing portions of ash; filtering; screening; cycloning; mechanically manipulating to remove a substantial portion of solid content; or combinations thereof. For example, conditioning may include one or more of the following processes, such as drying, grinding, removing fines, removing tramp metal, sizing, removing ferrous metals, removing portions of ash, filtering, screening, passing through a cyclone, mechanically manipulating, contacting with a magnet, or passing through a magnetic field. In certain embodiments, the conditioning may further include the addition of water or one or more alcohols, such as methanol, ethanol, propanol, isopropyl alcohol, glycerol, or butanol. For example, the renewable fuel oil may be conditioned by undergoing filtering, screening, cycloning, or mechanical manipulation processes to remove a substantial portion of solid content. In certain embodiments, conditioning of the biomass during the conversion to form a suitable renewable fuel oil may include removing a portion of carbon from the biomass by filtering, screening, cyclone, or mechanically manipulating the biomass. In certain embodiments, the thermal conversion process or thermo-mechanical conversion process may comprise a rapid thermal conversion process.

In certain embodiments, the renewable fuel oil may have a pH in the range of 0.5 to 8.0. For example, the renewable fuel oil may have a pH in the range of 0.5 to 7.0, such as 0.5 to 6.5, 1.0 to 6.0, 2.0 to 5.0, 3.0 to 7.0, 1.0 to 4.0, or 2.0 to 3.5. In certain embodiments, the pH of the renewable fuel oil may be less than 8.0, such as less than 7.0, less than 6.5, less than 6.0, less than 5.5, less than 5.0, less than 4.5, less than 4.0, less than 3.5, less than 3.0, less than 2.5, or less than 2.0. In certain embodiments, the pH of the renewable fuel oil may be altered or modified by the addition of an external, non-biomass derived material or pH altering agent. In certain embodiments, the renewable fuel oil may be acidic. For example, the renewable fuel oil may have a pH in the range of between 0.5 to 7, such as between 0.5 to 3, between 1 to 7, between 1 to 6.5, between 2 to 5, between 2 to 3, between 2 to 3.5, between 1 to 4, between 2 to 6, or between 2 to 5. In certain embodiments, the renewable fuel oil has the pH resulting from the conversion of the biomass from which it may be derived, such as a biomass-derived pH.

In certain embodiments, the renewable fuel oil may have a solids content in the range less than 5 wt. %. For example, the renewable fuel oil may have a solids content of less than 4 wt. %, less than 3 wt. %, less than 2.5 wt. %, less than 2 wt. %, less than 1 wt. %, less than 0.5 wt. %, or less than 0.1 wt. %. In certain embodiments, the renewable fuel oil may have a solids content in the range of between 0.005 wt. % and 5 wt. %. For example, the renewable fuel oil may have a solids content in the range of between 0.005 wt. % and 4 wt. %, such as between 0.005 wt. % and 3 wt. %, between 0.005 wt. % and 2.5 wt. %, between 0.005 wt. % and 2 wt. %, between 0.005 wt. % and 1 wt. %, between 0.005 wt. % and 0.1 wt. %, between 0.005 wt. % and 0.5 wt. %, between 0.05 wt. % and 4 wt. %, between 0.05 wt. % and 2.5 wt. %, between 0.05 wt. % and 1 wt. %, between 0.05 wt. % and 0.5 wt. %, between 0.5 wt. % and 3 wt. %, between 0.5 wt. % and 1.5 wt. %, or between 0.5 wt. % and 1 wt. %.

In certain embodiments, the renewable fuel oil may have an ash content of less than 0.5 wt. %. For example, the renewable fuel oil may have an ash content of less than 0.4 wt. %, such as less than 0.3 wt. %, less than 0.2 wt. %, less than 0.1 wt. %, less than 0.07 wt. %, less than 0.05 wt. %, less than 0.005 wt. %, or less than 0.0005 wt. %. In certain embodiments, the renewable fuel oil may have an ash content in the range of between 0.0005 wt. % and 0.5 wt. %, such as between 0.0005 wt. % and 0.2 wt. %, between 0.0005 wt. % and 0.05 wt. %, between 0.0005 wt. % and 0.1 wt. %, between 0.05 wt. % and 0.15 wt. %, or between 0.07 wt. % and 0.12 wt. %.

In certain embodiments, the renewable fuel oil may comprise a water content in the range of between 10-40 wt. %. For example, the renewable fuel oil may comprise a water content in the range of between 15 and 35 wt. %, such as between 15 and 30 wt. %, between 20 and 35 wt. %, between 20 and 30 wt. %, between 30 and 35 wt. %, between 25 and 30 wt. %, between 20 and 25 wt. %, between 22 and 24 wt. %, or between 32 and 33 wt. % water. In certain embodiments, the renewable fuel oil may comprise a water content in the range of less than 40 wt. %, such as less than 35 wt. %, or less than 30 wt. %. In certain embodiments, the renewable fuel oil may comprise a water content of at least 10 wt. %, such as at least 15 wt. %, at least 20 wt. %, or at least 25 wt. %. In certain embodiments, the renewable fuel oil may comprise a water content of 23 wt. %. In certain embodiments, the renewable fuel oil may comprise a water content of less than 25 wt. %. In certain embodiments, the water content of the renewable fuel oil may be in the range of 0.05 wt. % to 40 wt. %. In certain embodiments, the water content of the renewable fuel oil (RFO) may be in the range of 20 wt. % to 30 wt. %, 20 wt. % to 25 wt. %, 20 wt. % to 22 wt. %, or 22 wt. % to 25 wt. %, or 25 wt. % to 30 wt. %. For example, the water content of the renewable fuel oil (RFO) introduced into the combustion system may be in the range of 1 wt. % to 35 wt. %, such as 5 wt. % to 35 wt. %, 10 wt. % to 30 wt. %, 10 wt. % to 20 wt. %, 10 wt. % to 15 wt. %, 15 wt. % to 25 wt. %, 15 wt. % to 20 wt. %, 20 wt. % to 35 wt. %, 20 wt. % to 30 wt. %, 20 wt. % to 25 wt. %, 25 wt. % to 30 wt. %, or 30 wt. % to 35 wt. %. In certain embodiments, the water content of the renewable fuel oil (RFO) feedstock introduced into a combustion system may be at least 23 wt. % such as at least 25 wt. %, at least 28 wt. %, at least 30 wt. %, at least 31 wt. %, at least 32 wt. %, at least 33 wt. %, or at least 35 wt. %. In certain embodiments, the water content of the renewable fuel oil (RFO) feedstock introduced into the combustion system may be at least 1 wt. %, such as at least 10 wt. %, at least 15 wt. %, at least 20 wt. %, or at least 30 wt. %. In certain embodiments, the water content of the renewable fuel oil may be less than 38 wt. %, such as less than 35 wt. %, less than 34 wt. %, less than 30 wt. %, less than 25 wt. %, less than 20 wt. %, or less than 15 wt. %.

In certain embodiments, the renewable fuel oil may comprise an oxygen content level higher than that of a petroleum fraction feedstock, or a fossil fuel for example a heating fuel oil. For example, the renewable fuel oil may have an oxygen content level of greater than 20 wt. %, on a dry basis or moisture-free basis, such as an oxygen content level in the range of between 20 wt. % and 50 wt. %, between 35 wt. % and 40 wt. %, between 25 wt. % and 35 wt. %, between 20 wt. % and 30 wt. %, between 25 wt. % and 50 wt. %, between 20 wt. % and 40 wt. %, or between 20 wt. % and 35 wt. %, on a dry basis or moisture-free basis.

In certain embodiments, the renewable fuel oil may comprise a greater oxygen content level than carbon content level. For example, the renewable fuel oil may have a greater oxygen content level than carbon content level, on a moisture-containing basis. In certain embodiments, the renewable fuel oil may have in the range of between 35-80 wt. % carbon content and in the range of between 20-50 wt. % oxygen content, on a dry basis or moisture-free basis. For example, the renewable fuel oil may have in the range of between 50-60 wt. % carbon content and in the range of between 35-40 wt. % oxygen content, on a dry basis or moisture-free basis.

In certain embodiments, the renewable fuel oil may comprise a carbon content level of at least 40 wt. % of the carbon content contained in the biomass from which it may be derived. For example, the renewable fuel oil may comprise a carbon content level of at least 45 wt. %, such as at least 50 wt. %, at least 55 wt. %, at least 60 wt. %, at least 65 wt. %, at least 70 wt. %, at least 75 wt. %, at least 80 wt. %, at least 85 wt. %, at least 90 wt. %, or at least 95 wt. % of the carbon content contained in the biomass from which it may be derived. In certain embodiments, the renewable fuel oil may comprise a carbon content level in the range of between 40 wt. % and 100 wt. % of the carbon content contained in the biomass from which it may be derived. For example, the renewable fuel oil may comprise a carbon content level in the range of between 40 wt. % and 95 wt. %, between 40 wt. % and 90 wt. %, between 40 wt. % and 80 wt. %, between 50 wt. % and 90 wt. %, between 50 wt. % and 75 wt. %, between 60 wt. % and 90 wt. %, between 60 wt. % and 80 wt. %, between 70 wt. % and 95 wt. %, between 70 wt. % and 80 wt. %, or between 70 wt. % and 90 wt. % of the carbon content contained in the biomass from which it may be derived. In certain embodiments, the renewable fuel oil may comprise a carbon content level lower than that of a petroleum fraction feedstock. For example, the renewable fuel oil may comprise a carbon content level in the range of between 35 wt. % to 80 wt. %, on a dry basis moisture-free basis, such as between 40 wt. % to 75 wt. %, between 45 wt. % to 70 wt. %, between 50 wt. % to 65 wt. %, between 50 wt. % to 60 wt. %, or between 54 wt. % to 58 wt. %, on a dry basis or moisture-free basis.

In certain embodiments, the renewable fuel oil may have a kinematic viscosity in the range of 15 cSt to 180 cSt at 40° C., 15 cSt to 30 cSt, 30 cSt to 40 cSt, 40 cSt to 80 cSt, 50 cSt to 70 cSt, 55 cSt to 65 cSt, or 80 cSt to 200 cSt at 40° C.

By way of example, Tables 1 & 2 provide analyses of several suitable unenriched renewable fuel oils which were prepared according to one or more of the procedures described in U.S. Pat. No. 7,905,990, U.S. Pat. No. 5,961,786, and U.S. Pat. No. 5,792,340, each of which is incorporated by reference in their entirety.

TABLE 1

Analytical Results for Alcell Lignin - Mild Run (LS-3) & Severe Run (LS-4)

|  | LS-3 | LS-4 |
|---|---|---|
| Volatiles (wt %) | 14.7 | 27.9 |
| Moisture Content (wt %) | 1.0 | 0.9 |
| Ash content (wt %) | 0.05 | 1.00 |
| Elemental (wt %, MAF) | | |
| Carbon | 68.68 | 73.04 |
| Hydrogen | 7.16 | 6.52 |
| Nitrogen | 0.00 | 0.01 |
| Oxygen (difference) | 24.16 | 20.43 |
| Hydroxyl (wt %) | 7.54 | 7.50 |
| Methoxyl (wt %) | 15.68 | 1.02 |
| Sequential Solubility (wt %) | | |
| Diethyl Ether | 41.8 | 40.3 |
| Ethyl Acetate | 48.9 | 42.4 |

TABLE 1-continued

Analytical Results for Alcell Lignin -
Mild Run (LS-3) & Severe Run (LS-4)

|  | LS-3 | LS-4 |
| --- | --- | --- |
| Methanol | 0.2 | 0.6 |
| Residue | 9.1 | 16.7 |
| Fractionation (wt %) | | |
| Organic Acids | 31.7 | 3.6 |
| Phenols & Neutrals | 45.0 | 81.7 |
| Residue | 23.3 | 14.1 |

TABLE NOTE:
Mild Run (LS-3) was rapid thermal processed at about 500° C. and the Severe Run (LS-4) was rapid thermal processed at about 700° C.

TABLE 2

Analytical Results of Renewable Fuel Oil Derived from Wood Biomass

| LABORATORY | 1) | 1) | 2) | 3) | 3) | 4) | 5) | AVERAGE |
| --- | --- | --- | --- | --- | --- | --- | --- | --- |
| SPECIFIC GRAVITY | 1.19 | 1.20 | 1.21 | 1.217 | 1.226 | 1.186 | 1.188 | 1.20 |
| WATER CONTENT (% by wt) | 26 | 27 | 21 | 20.5 | 21 | 28.1 | | 23.9 |
| CHAR CONTENT (% by wt) | 2.0 | 0.6 | | 1.4 | 2.2 | 5.5 | 2.2 | 2.3 |
| HIGHER HEATING (BTU/lb) | 7267 | 7310 | 9245 | 7525 | 7955 | 6536 | 6880 | 7525 |
| ELEMENTAL (%, MAF) | | | | | | | | |
| CARBON | 55.1 | | 53.63 | 55.5 | 52.8 | 58.27 | 51.5 | 54.5 |
| HYDROGEN | 6.7 | | 6.06 | 6.7 | 6.9 | 5.5 | 6.8 | 6.4 |
| NITROGEN | 0.15 | | 0.24 | 0.1 | <0.1 | 0.39 | 0.17 | 0.18 |
| SULFUR | | | 0.02 | | | <0.14 | 0.07 | <.001 |
| ASH (% by wt) | | | | 0.13 | 0.15 | 0.22 | 0.13 | 0.16 |

TABLE NOTES:
The RFO derived from the Wood Biomass was analyzed by the following labs:
1) Universite Catholique de Louvain, Belgium;
2) ENEL, Centro Ricerca Termica, Italy;
3) VTT, Laboratory of Fuel and Process Technology, Finland;
4) CANMET, Energy Research Laboratories, Canada;
5) Commercial Testing and Engineering Co., U.S.A.

In certain embodiments, the renewable fuel oil may comprise an energy content level of at least 30% of the energy content contained in the biomass from which it may be derived. For example, the renewable fuel oil may comprise an energy content level of at least 45%, such as at least 55%, at least 60%, at least 65%, at least 70%, at least 75%, at least 80%, at least 85%, at least 90%, or at least 95% of the energy content contained in the biomass from which it may be derived. In certain embodiments, the renewable fuel oil may comprise an energy content level in the range of between 50% and 98% of the energy content contained in the biomass from which it may be derived. For example, the renewable fuel oil may comprise a energy content level in the range of between 50% and 90%, between 50% and 75%, between 60% and 90%, between 60% and 80%, between 70% and 95%, between 70% and 80%, or between 70% and 90% of the energy content contained in the biomass from which it may be derived.

In certain embodiments, the renewable fuel oil may comprise an energy content level lower than that of a petroleum fuel. For example, the renewable fuel oil may comprise a energy content level in the range of between 30-95%, on a dry basis (moisture-free basis), relative to the energy content of a petroleum feedstock, such as between 40-90%, between 45-85%, between 50-80%, between 50-60%, or between 54-58%, on a dry basis or moisture-free basis, relative to the energy content of a petroleum feedstock. In certain embodiments, the renewable fuel oil may have an energy content in the range of between 30-90%, relative to the petroleum fraction feedstock energy content. For example, the renewable fuel oil may have an energy content of 35%, 40%, 45%, 50%, 55%, 60%, 65%, 70%, 75%, 80%, or 85%, relative to the petroleum fraction feedstock energy content.

According to one embodiment, the renewable oil includes all of the whole liquid produced from the thermal or catalytic conversion of biomass, with preferably low water content. Alternatively, whole liquid produced from the thermal or catalytic conversion of biomass may be phase separated to provide a predominately non-aqueous fraction as the feedstock for refinery systems. In addition, fractions can be taken from the unit operations of the downstream liquid collection system of thermal or catalytically converted biomass such as a primary condenser means, a secondary condenser, demister, filter, or an electrostatic precipitator.

According to one embodiment, the flash point of a renewable oil may be increased to reduce the volatile content of the liquid. According to one embodiment, the flash point of a renewable oil may be increased to reduce the volatile content of the liquid and subsequently co-processed in an FCC with a petroleum feedstock. The flash point would be increased above the range of 55-62° C. as measured by the Pensky-Martens closed cup flash point tester (e.g. ASTM D-93). Various methods and apparatus can be used to effectively reduce the volatile components, such as wiped film evaporator, falling film evaporator, flash column, packed column, devolatilization vessel or tank. Reduction of the some of the volatile components of the renewable can help to reduce components such as phenols.

According to one embodiment a renewable fuel oil may be blended with vegetable based oils, as well as alcohols including methanol and ethanol, with or without a surfactant, prior to use in a combustion system.

In certain embodiments, the method includes utilizing a renewable fuel oil to generate heat to warm buildings or other facilities where people live, work, recreate or conduct other activity.

A representative renewable fuel oil heating system is illustrated in FIG. 1. According to this embodiment, a supply of renewable fuel oil is delivered by tanker truck 116. Renewable fuel oil is pumped via storage fill pump 112 through transfer lines 138 and 140 into storage tank 110. Vapors present in storage tank 110 are displaced through vapor return line 142 and/or conservation valve line 146. Carbon filter 114 may be in communication with conservation valve line 146 to capture certain compounds present in the vapor, for example sotolon. Vapors transferred through vapor return line 142 are sequestered in tanker truck 116.

Renewable fuel oil is transferred from storage tank 110 by positive displacement pump 108. To maintain constant temperature and phase stability of the stored renewable fuel oil, a portion of the renewable fuel oil is recirculated by recirculation lines 132 and 134. To affect the aforementioned temperature maintenance, a portion of recirculated renewable fuel oil passed through heat exchanger 106 to heat renewable fuel oil portion 132 before return to storage tank 110. A typical heat exchanger 106 might comprise a shell and tube exchanger utilizing hot water as a heat source.

In the representative embodiment illustrated in FIG. 1, a portion of heated renewable fuel oil 130 is supplied to burner 102, where renewable fuel oil undergoes combustion with air supplied by air feed 144. The combustion flame is directed to firebox 100A of boiler 100. Heat transfer from firebox 100A to boiler tubes 100 B generates steam for use in heating applications.

The representative embodiment illustrated in FIG. 1 includes a second fuel source 104, for example heating fuel oil no. 4, which may be combusted instead of renewable fuel oil in the event of a temporary interruption in the supply of renewable fuel oil 130.

The representative embodiment illustrated in FIG. 1 includes heat sink 120 placed in the firebox 100A for absorbing, radiating and/or reflecting heat, for example an extended burner block with a cylindrical orifice or an assembly of refractory bricks placed in close proximity of the combusting renewable fuel oil. Heat sink 120 may be positioned to radiate and/or reflecting sufficient heat to promote vaporization and/or ignition of the renewable fuel oil and/or maximize combustion and/or restart combustion of the renewable fuel oil in the event of a flame-out.

In certain embodiments, the method includes utilizing a renewable fuel oil to produce one or more cellulosic renewable identification numbers such as a D-code 7-compliant renewable identification number.

In certain embodiments, a series of renewable fuel oil shipments made by tanker truck are supplied to a storage tank in communication with a combustion or thermal system. In certain embodiments, each shipment originates from a facility that produces an unenriched renewable fuel oil by rapid thermal processing. In certain embodiments, the temperature of the unenriched renewable fuel oil is adjusted prior to shipment in the tanker truck to a specified temperature, such as a temperature in the range of 10° C. to 40° C., 10° C. to 20° C., 10° C. to 30° C., 20° C. to 30° C., 30° C. to 40° C., 20° C. to 40° C., 20° C. to 30° C., or 30° C. to 40° C. In certain embodiments, the temperature of a renewable fuel oil, for example an unenriched renewable fuel oil, is maintained at an approximately constant temperature throughout loading of the renewable fuel oil, for example an unenriched renewable fuel oil, from a production facility onto a tanker truck, transport, offloading and storage, for example in a storage tank. In certain embodiments, a series of unenriched renewable fuel oil shipments are supplied to a storage tank in communication with a combustion system. In certain embodiments, the renewable fuel oil in each of the series of shipments has a water content, measured as a weight percentage, subject to a quality control requirement that specifies the water content will vary by no more than a specified percentage among shipments. For example, the renewable fuel oil in each of the series of shipments may have a water content specified to vary by no more than 1%, 2%, 3%, 4%, or 5% among the series of shipments. In certain embodiments, the series of deliveries must be completed within one week, two weeks, one month, two months, three months, or six months. In certain embodiments, the renewable fuel oil is an unenriched renewable fuel oil.

In certain embodiments, the invention relates to a method of transferring a shipment of renewable fuel oil from a tanker truck to a storage tank in communication with a combustion or thermal system. In certain embodiments, the invention relates to a method of transferring a shipment of unenriched renewable fuel oil from a tanker truck to a storage tank in communication with a combustion or thermal system. In certain embodiments, the combustion system comprises a boiler, a furnace, a kiln, and/or an evaporative cooling system. In certain embodiments, the invention relates to a method of transferring a shipment renewable fuel oil from a tanker truck to a storage tank in communication with a boiler. In certain embodiments, the invention relates to a method of transferring a shipment of unenriched renewable fuel oil from a tanker truck to a storage tank in communication with a boiler. In certain embodiments, the invention relates to a method of transferring a shipment of renewable fuel oil from a tanker truck to a storage tank in communication with a combustion or thermal system, wherein the renewable fuel oil is transferred at an approximately constant temperature. For example, the temperature of the renewable fuel oil may be maintained at an approximately constant temperature during transfer in the range of 10° C. to 40° C., 10° C. to 20° C., 10° C. to 30° C., 20° C. to 30° C., 30° C. to 40° C., 20° C. to 40° C., 20° C. to 30° C., or 30° C. to 40° C. In certain embodiments, the invention relates to a method of transferring a shipment of renewable fuel oil from a tanker truck to a storage tank in communication with a combustion or thermal system, wherein the renewable fuel oil is transferred at an temperature within a specified range relative to the temperature of any renewable fuel oil initially present in the storage tank. For example, the renewable fuel oil may be transferred at a temperature that is within 1° C., 2° C., 3° C., 4° C., or 5° C. of the temperature of any renewable fuel oil initially present in the storage tank.

In certain embodiments, the invention relates to a method of transferring a shipment of renewable fuel oil from a tanker truck to a storage tank in communication with a combustion system, comprising collecting the vapors displaced by the addition of the renewable fuel oil to the storage tank in the tanker truck. In certain embodiments, the invention relates to a method of transferring a shipment of unenriched renewable fuel oil from a tanker truck to a storage tank in communication with a combustion system, comprising collecting the vapors displaced by the addition of the renewable fuel oil to the storage tank in the tanker truck. In certain embodiments, the invention relates to a method of transferring a shipment of renewable fuel oil from a tanker truck to a storage tank in communication with a combustion system, wherein substantially all of the vapors are collected in the tanker truck. In certain embodiments, no more than an insignificant quantity of the vapors displaced by the addition of the renewable fuel oil to the storage tank is emitted to the atmosphere during transfer. In certain embodiments, the tank is equipped with a conservation vent equipped with a carbon filter. In certain embodiments, the carbon filter comprises activated carbon or charcoal. In certain embodiments, the conservation vent is not opened during the transfer of vapors from the storage tank to the tanker truck. In certain embodiments, the total lifetime and/or the life of the carbon filter between recharging is increased relative to a transfer of the renewable fuel oil wherein the displaced vapors are not sequestered in the tanker truck. For example, the total lifetime and/or the life of the carbon filter between recharging may be increased by 50%, 100%, 200%, 500% and 1000%. In certain embodiments, the vapors collected in the tanker truck may be removed from the storage site. In certain embodiments, the vapors collected in the tanker truck are odorous. In certain embodiments, the vapors collected in the tanker truck comprise sotolon. In certain embodiments, In certain embodiments, pressure in the storage tank during transfer of a shipment of renewable fuel oil does not change by more than a specified threshold, such as 1 psig, 3 psig, or 5 psig In certain embodiments, the invention relates to a system for transferring a shipment of renewable fuel oil from a tanker truck to a storage tank in communication with a combustion system. In certain embodiments, the invention comprises transfer hosing, transfer piping and a transfer pump to transfer a shipment of renewable fuel oil from a tanker truck to a storage tank, a storage tank with return piping and return hosing capable of attaching to the tanker truck, and a conservation valve equipped with a carbon filter. In certain embodiments, the transfer piping, the return piping, and the conservation valve connect at the top of the storage tank. In certain embodiments, the transfer piping, the return piping, and/or the transfer pump are constructed of suitable materials for containing the renewable fuel oil without corrosion. In certain embodiments, the transfer piping, the return piping, and/or components of the transfer pump are lined with a suitable elastomer for containing the renewable fuel oil without corrosion. In certain embodiments, the transfer piping, the return piping, and/or components of the transfer pump are constructed of metal alloys where required to prevent corrosion. In certain embodiments, the transfer piping, the return piping, and/or components of the transfer pump are constructed of 304 or 316 stainless steel to prevent corrosion. In certain embodiments, the return piping and the return hosing are sized such that less than a specified percentage of any vapors displaced from the storage tank during the transfer of the renewable fuel oil pass through the carbon filter, for example less than 5%, 10%, 15%, or 20% of the displaced vapors.

In certain embodiments, the storage tank may be self-contained, double-walled, lined with elastomer, and/or constructed of 304 or 306 stainless steel. In certain embodiments, the storage tank may be a bunker tank. In certain embodiments, the storage tank may contain a supply of fuel for up to a specified period of time. For example, the storage tank may contain a supply of fuel for up to one week, two weeks, one month, three months, six months, or one year.

In certain embodiments, the invention relates to a method, system, or apparatus for avoiding phase separation of the renewable fuel oil stored in the storage tank for combustion in a combustion system. In certain embodiments, the renewable fuel oil stored in the storage tank may be agitated in the storage tank. In certain embodiments, the renewable fuel oil stored in the storage tank may be agitated by a operating a mixer such as a mechanical impeller located in the storage tank. In certain embodiments, the renewable fuel oil stored in the storage tank may be agitated by recirculating a specified percentage of the renewable fuel oil per unit time tough an external pump. For example, the percentage of stored renewable fuel oil recirculated per hour may be in the range of 0% to 100%, for example 0% to 50%, 0% to 25%, 25% to 50%, 50% to 75%, or 50% to 100%; the percentage of stored renewable fuel oil recirculated per hour may be less than 10%, for example less than 5%, less than 2%, or less than 1%. In certain embodiments the pumping is performed by a renewable fuel oil delivery pump in fluid communication with the storage tank.

In certain embodiments, the invention relates to a method for maintaining a renewable fuel oil stored in the storage tank for combustion in a combustion system at a relatively constant temperature. For example, the method may maintain the temperature within 2%, 5%, or 10% of the average temperature of the renewable fuel oil stored in the storage tank. In certain embodiments, the temperature of the renewable fuel oil is maintained at a relatively constant temperature in the storage tank by dynamically recirculating, or simply recirculating, a specified percentage per unit time and warming or cooling the recirculating portion of the renewable fuel oil. For example, the percentage of stored renewable fuel oil recirculated per hour may be in the range of 0% to 100%, for example 0% to 50%, 0% to 25%, 25% to 50%, 50% to 75%, or 50% to 100%. In certain embodiments, the invention relates to a method, apparatus, or system for maintaining a renewable fuel oil stored for combustion in a combustion system at a relatively constant temperature by pumping a portion of the renewable fuel oil through an external heat exchanger whose outlet is in fluid communication with the storage tank. In certain embodiments the pumping is performed by a renewable fuel oil delivery pump in fluid communication with the storage tank and the external heat exchanger. In certain embodiments the renewable fuel oil delivery pump is a positive displacement pump. In certain embodiments the renewable fuel oil delivery pump is a gear pump, piston pump, or a diaphragm pump. In certain embodiments the external heat exchanger is a renewable fuel oil heater. In certain embodiments the renewable fuel oil heater utilizes hot water as a heat transfer fluid. In certain embodiments the renewable fuel oil heater is a shell and tube heat exchanger. In certain embodiments the renewable fuel oil heater and the renewable fuel oil delivery pump are constructed of corrosion resistant materials. For example, the renewable fuel oil heater and the renewable fuel oil delivery pump may each comprise a corrosion resistant elastomer and/or corrosion resistant metal alloy (for example, 304 or 316 stainless steel).

For example, the method may maintain the temperature within 2%, 5%, or 10% of the average temperature of the renewable fuel oil stored in the storage tank. In certain embodiments, the temperature of the renewable fuel oil is maintained at a relatively constant temperature in the storage tank by dynamically recirculating a specified percentage per unit time and warming or cooling the recirculating portion of the renewable fuel oil. For example, the percentage of stored renewable fuel oil recirculated per hour may be in the range of 0% to 100%, for example 0% to 50%, 0% to 25%, 25% to 50%, 50% to 75%, or 50% to 100%.

In certain embodiments, the invention relates to a method, apparatus, or system for maintaining a renewable fuel oil stored for combustion in a combustion system at a relatively constant temperature by pumping a portion of the renewable fuel oil through an external heat exchanger whose outlet is in fluid communication with the storage tank. In certain embodiments the pumping is performed by a renewable fuel oil delivery pump in fluid communication with the storage tank and the external heat exchanger. In certain embodiments the renewable fuel oil delivery pump is a positive displacement pump. In certain embodiments the renewable fuel oil delivery pump is a gear pump, piston pump, or a diaphragm pump. In certain embodiments the external heat exchanger is a renewable fuel oil heater. In certain embodiments the renewable fuel oil heater utilizes hot water as a heat transfer fluid. In certain embodiments the renewable fuel oil heater is a shell and tube heat exchanger. In certain embodiments the renewable fuel oil heater and the renewable fuel oil delivery pump are constructed of corrosion resistant materials. For example, the renewable fuel oil heater and the renewable fuel oil delivery pump may each comprise a corrosion resistant elastomer and/or a corrosion resistant metal alloy (for example, 304 or 316 stainless steel). In certain embodiments, the invention relates to an apparatus or system comprising a process controller and temperature control valve in fluid contact with the renewable fuel oil heater and the storage tank, wherein the process controller maintains the renewable fuel oil stored for combustion in a combustion system at a relatively constant temperature by adjusting the temperature control valve and or the rate of heat transfer fluid.

In certain embodiments, the invention relates to a method of combusting a renewable fuel oil wherein the renewable fuel oil is pre-heated to a specified temperature and the heated renewable fuel oil is pumped to a fuel delivery train in a combustion system. For example the renewable fuel oil may be pre-heated to a temperature in the range of 50° C. to 80° C., for example 50° C. to 70° C., 50° C. to 55° C., 55° C. to 60° C., 60° C. to 65° C., 65° C. to 70° C., or 75° C. to 80° C. In certain embodiments, the invention relates to a method, system, and/or apparatus for pre-heating a renewable fuel oil prior to combustion by pumping the renewable fuel oil through a renewable fuel oil heater in fluid contact with a fuel delivery train in a combustion system. In certain embodiments, the renewable fuel oil heater is heated by combustion of a separate portion of the renewable fuel oil.

In certain embodiments, the invention relates to a method of combusting a renewable fuel oil wherein the renewable fuel oil is pumped by a renewable fuel oil pump from a storage tank to a fuel delivery train at a specified pressure. For example, the renewable fuel oil may be delivered to the fuel delivery train at a pressure of 100 psig, 60 psig to 80 psig, 80 psig to 100 psig, 100 psig to 120 psig, or 120 psig to 140 psig In certain embodiments, the invention relates to an apparatus or system comprising a process controller and pressure control valve in fluid contact with the renewable fuel oil pump and the storage tank, wherein the process controller maintains the specified pressure by adjusting the pressure control valve and/or the speed of the renewable fuel oil pump.

In certain embodiments, the invention includes a combustion system. In certain embodiments, the combustion system present includes an apparatus, and a method of using the same, for example a boiler. In certain embodiments, the boiler or combustion system comprises a boiler, a furnace, a kiln, and/or an evaporative cooling system. In certain embodiments, the combustion system may be a commercial boiler. In certain embodiments, the boiler or combustion system may be an industrial boiler. In certain embodiments, the boiler may be a firetube boiler. In certain embodiments, the boiler may be a water-tube boiler. In certain embodiments, the boiler may meet a specified BTU demand or thermal load. For example, the boiler may deliver more than 1 MMBtu per hour, 2 MMBtu per hour, 3 MMBtu per hour, 4 MMBtu per hour, 5 MMBtu per hour, 6 MMBtu per hour, 7 MMBtu per hour, 8 MMBtu per hour, 10 MMBtu per hour, or 20 MMBtu per hour. In certain embodiments, the boiler may have an efficiency of at least 70%, at least 80%, at least 85%, at least 88%, or at least 89%, as measured by the input-output method and/or the heat loss method. In certain embodiments, the boiler may have an efficiency of between 70% and 99.999%, for example, 70% and 75%, 75% and 80%, 80% and 85%, 85% and 90%, 90% and 95%, or 95% and 99.999%, as measured by the input-output method and/or the heat loss method. If the input-output method is used, the boiler efficiency computation may use the higher heating value or the lower heating value of the fuel.

In certain embodiments, the invention includes a boiler system, a boiler apparatus, and a method of using the same. In certain embodiments, the boiler system may comprise a fire box, a burner system, a refractory or heat sink component for absorbing, radiating and/or reflecting heat, a supply of fuel, a supply of air, and a control system. In certain embodiments, the supply of fuel may comprise a renewable fuel oil. In certain embodiments, the supply of fuel may comprise an unenriched renewable fuel oil. In certain embodiments, the supply of fuel may comprise a petrochemical or fossil fuel, for example a heating fuel oil or a diesel fuel. In certain embodiments, the supply of air may comprise a stream of atomization air and a stream of combustion air. In certain embodiments, the boiler system may comprise a stream of atomization steam. In certain embodiments, the boiler is firetube boiler. In certain embodiments, the firetube boiler comprises a soot blowing system. In certain embodiments the soot blowing system provides pulses of compressed air to the fire tubes of the firetube boiler on a pre-determined schedule or a pre-determined frequency. In certain embodiments, the compressed air is at a pressure of 50 psig, 75 psig, 100 psig, 125 psig, 150 psig, or between 90 psig and 110 psig. In certain embodiments, the pulses of compressed air last less than 1 second, less than 2 seconds, less than 3 seconds, less than 5 seconds, or a few seconds. In certain embodiments, the pre-determined schedule or predetermined frequency comprises 1 cycle per day, 4 cycles per day, 8 cycles per day, or between 1 and 12 cycles per day. In certain embodiments, the pre-determined frequency is at least every 15 minutes, for example every 15 minutes, or at least once per day, for example every 30 minutes, every 60 minutes, every 90 minutes, every 2 hours, every 3 hours, every 6 hours or every 12 hours. In certain embodiments, a cycle comprises delivering pulses of compressed air simultaneously. In other embodiments, a cycle comprises delivering pulses of compressed air to the firetubes in a pre-determined sequence.

In certain embodiments, the boiler system may comprise one or more boiler control systems. In certain embodiments, the boiler control system may control the rate of feed supplied to the burner in order to maintain a relatively constant boiler steam pressure. In certain embodiments, the boiler control system may control the rate of addition of combustion air to the burner in order to maintain a relatively constant oxygen concentration in the flue gas.

The burner system may be comprised of any type of burner suitable for use in a boiler. In certain embodiments, the burner system may comprise a fuel train, a burner, and a safety fuel shut-off valve. In certain embodiments, the burner may comprise a fuel gun, an atomization assembly, a nozzle, and a combustion air supply. In certain embodiments, the burner system may comprise an atomization air supply. In certain embodiments, the burner system may comprise an atomization steam supply. In certain embodiments, the burner may utilize internal atomization. In certain embodiments, the burner may utilize internal atomization by combining fuel with a gas, for example steam or air. In certain embodiments, the burner may utilize external atomization. In certain embodiments, the nozzle may be made of a stainless steel or brass. In certain embodiments, the safety fuel shut-off valve may be a block valve. In certain embodiments, the burner system is capable of maintaining combustion of a renewable fuel oil at a temperature of 1,500° C. to 2,000° C. In certain embodiments, the burner system is capable of maintaining combustion of a renewable fuel oil having an adiabatic flame temperature of 1,300° C. to 1,800° C. In certain embodiments, the burner system may have a pilot lighting system. In certain embodiments, the pilot lighting system may be a propane lighting system. In certain embodiments, the pilot lighting system may be intermittent, or may activate only when ignition of the fuel is required and shut off after a combustion flame is established.

In certain embodiments, the burner system may be a dual-use or dual-fuel burner system, for example a burner system capable of being controlled to combust any one of at least two supplies of fuel or two different fuels. In certain embodiments, the burner system is controlled to combust any one of at least two different fuels at predetermined flow rates. In certain embodiments, the burner system is controlled to combust any one of at least two different fuels to meet a dynamic or a predetermined heating demand. For example, the burner system may be capable of combusting a heating fuel oil fuel and a renewable fuel oil. In certain embodiments, the invention relates to a method of combustion wherein the burner system burns a first fuel at a first specified volumetric flow rate, temperature and air to fuel ratio and a second fuel at a second specified volumetric flow rate, temperature and air to fuel ratio. For example, the burner system may combust a heating oil at a temperature of 1,900 to 2,300° C. with an atomized fuel-to-air ratio of 0.8:1 to 5:1 and burning a second fuel in the burner at a temperature of 1,300 to 1,800° C. with an atomized fuel-to-air ratio of 0.4:1 to 4:1. For example, the burner system may combust a heating fuel oil having an adiabatic flame temperature of 1,900 to 2,300° C. with a fuel-to-air ratio of 0.8:1 to 5:1 and burning a second fuel in the burner having an adiabatic flame temperature of 1,300 to 1,800° C. with an fuel-to-air ratio of 0.4:1 to 4:1. In certain embodiments, the invention relates to a method of combustion, comprising burning a first fuel in a burner with an adiabatic flame temperature of 1,900 to 2,300° C. and a fuel-to-air ratio resulting in 1%, 2%, 3%, 4%, or between 2% and 4% oxygen in the combustion flue gas, and burning a second fuel in the burner with an adiabatic flame temperature at least 300° C. below that of the first fuel and an fuel-to-air ratio resulting in 1%, 2%, 3%, 4%, or between 2% and 4% oxygen in the combustion flue gas produced by combustion of the second fuel.

In certain embodiments, the invention relates to burning a renewable fuel oil (RFO) with excess air such that there is a 1%, 2%, 3%, 4%, or between 2% and 4% excess oxygen on a stoichiometric basis in the mixture of fuel and air. In certain embodiments, the invention relates to burning a renewable fuel oil (RFO) with excess air such that there is 1 vol. %, 2 vol. %, 3 vol. %, 4 vol. %, between 2 vol. % and 4 vol. %, or between 3 vol. % and 6 vol. % oxygen in the combustion flue gas following combustion.

In certain embodiments, the invention relates to burning a renewable fuel oil (RFO) to produce a combustion flue gas comprising nitrogen oxides ($NO_x$), carbon monoxide, sulfur oxides ($SO_x$), and particulate matter (PM). In certain embodiments, the concentration of NO in the combustion flue gas is less than 375 ppm, less than 225 ppm, less than 150 ppm, less than 110 ppm, or less than 75 ppm. In certain embodiments, the concentration of CO in the combustion flue gas is less than 50 ppm, less than 30 ppm, less than 20 ppm, less than 15 ppm, or less than 10 ppm. In certain embodiments, the concentration of $SO_x$ in the combustion flue gas is less than 1 ppm, less than 0.5 ppm, or less than 0.2 ppm. In certain embodiments, the PM generated is less than 0.5 lb/MMBtu, less than 0.3 lb/MMBtu, less than 0.2 lb/MMBtu, less than 0.15 lb/MMBtu, or less than 0.1 lb/MMBtu.

In certain embodiments, the a renewable fuel oil (RFO) has a lower adiabatic flame temperature than a petroleum-based fuel. In certain embodiments, the adiabatic flame temperature of the second fuel is at least 200° C., 300° C., 400° C., 500° C., 600° C., or between 100° C. and 1000° C. below the adiabatic flame temperature of the first fuel.

In certain embodiments, the burner system may comprise a start-up burner fuel bypass line in fluid contact with a storage tank.

In certain embodiments, the burner system may comprise a post-combustion purge system. In certain embodiments, the post-combustion purge system may be located between a safety fuel shut-off valve and an orifice of the burner. In certain embodiments, post-combustion purge system may be capable of removing substantially all of the residual fuel between the safety fuel shut-off valve and an orifice of the burner within a specified period of time after the safety fuel shut-off valve closes. For example, post-combustion purge system may be capable of removing greater than 85% of the residual fuel between the safety fuel shut-off valve and the orifice within 2 seconds, 5 seconds, 10 seconds, 15 seconds, 20 seconds, or 30 seconds after the safety fuel shut-off valve closes.

In certain embodiments, the invention relates to a post-combustion purge method of purging the burner system of residual fuel during and/or after shutdown. In certain embodiments, the post-combustion purge method reduces or prevents formation of coke in the burner. In certain embodiments, the post-combustion purge method reduces or eliminates odors caused if residual fuel smolders in the burner, for example the Morrison tube of a boiler, and/or a combustion space such as a fire box. In certain embodiments, the post-combustion purge method comprises blowing compressed air through a fuel line to cause residual fuel located between a safety fuel shut-off valve and an orifice of the burner to discharge into a combustion space, for example a fire box. In certain embodiments, the discharged residual fuel may be combusted in the fire box. In certain embodiments, the post-combustion purge method comprises pumping residual fuel out of the fuel region located between a safety fuel shut-off valve and an orifice of the burner. In certain embodiments, the post-combustion purge method utilizes a scavenger pump located at the inlet side of the burner to suck residual fuel out of the fuel region located between a safety fuel shut-off valve and an orifice of the burner. In certain embodiments, the post-combustion purge method delivers the residual fuel to a storage tank.

In certain embodiments, the refractory or heat sink component for absorbing, radiating and/or reflecting heat is positioned in combustion space, for example in a boiler fire box proximate a pre-determined flame zone. In certain embodiments, the refractory or heat sink component is positioned proximate an atomized stream of fuel and air, for example in a boiler fire box proximate an atomized stream of fuel and air. In certain embodiments, the refractory or heat sink component is a pre-formed burner block. In certain embodiments, the refractory or heat sink component is a cylindrical or tube-shaped orifice formed of ceramic, refractory brick, refractory tile, or a suitable metal such as a stainless steel. In certain embodiments, the refractory or heat sink component is a retrofit or an extension to a pre-existing refractory component, for example a burner sleeve 1 inch to 3 inches in length. In certain embodiments, the heat sink component is a cylindrical or tube-shaped heat sink component that extends to shield at least 25% of the flame length in the direction of the flame. In certain embodiments, the cylindrical or tube-shaped heat sink component has a length-to-average diameter ratio of between 1:1 and 3:1, or between 1.5:1 and 2.5:1, or 2:1. In certain embodiments, the cylindrical or tube-shaped heat sink is 4 inches to 60 inches in length, for example 8 inches to 16 inches in length, or 40 inches to 60 inches in length.

In certain embodiments, the heat sink component reflects sufficient heat from the combustion flame and/or generates sufficient radiation to promote vaporization and ignition of the atomized renewable fuel oil, and/or to increase combustion of the atomized stream, and/or to restart the atomized stream of fuel after flame-out. In certain embodiments, the heat sink component shortens the distance from the burner nozzle to the point of ignition of the flame.

EXAMPLES

Example 1

A sample unenriched renewable fuel oil (RFO) feedstock was produced from rapid thermal processing of a wood residue feedstock in a commercial fast pyrolysis process, according to any one of U.S. Pat. No. 7,905,990, U.S. Pat. No. 5,961,786, and U.S. Pat. No. 5,792,340, each of which is herein incorporated by reference in their entirety. The properties of the renewable fuel oil (RFO) feedstock are summarized in Table 3.

TABLE 3

| Parameter | Test Method | RFO |
|---|---|---|
| Water Content, wt. % | ASTM E203 | 26.98% |
| Viscosity @ 40° C., cSt | ASTM D445 | 58.9 |
| Ash Content, wt. % | EN 055 | 0.02% |
| Solids Content, wt. % | ASTM D7579 | 0.04% |
| Density @ 20° C., kg/dm$^3$ | EN 064 | 1.1987 |
| pH | ASTM E70-07 | 2.44 |
| Carbon Content, wt. % as is | ASTM D5291 | 41.80% |
| Hydrogen Content, wt. % as is | ASTM D5291 | 7.75% |
| Nitrogen Content, wt. % as is | ASTM D5291 | 0.28% |
| Sulfur Content, wt. % as is | ASTM D5453 | 0.01% |
| Oxygen Content, wt. % as is | By Difference | 50.14% |
| HHV (as is), cal/g | ASTM D240 | 4093.8 |
| HHV (as is), MJ/kg | ASTM D240 | 17.1 |
| HHV (as is), BTU/lb | ASTM D240 | 7369 |

Example 2

An unenriched renewable fuel oil (RFO) was used to fire a retrofitted Cleaver Brooks CB-1-600-200-015 fire tube boiler (dual-fuel boiler). Table 4 gives compositional analysis of the unenriched renewable fuel oil (RFO).

TABLE 4

| Parameter | Test Method | RFO |
|---|---|---|
| Ash Content, wt. % | ASTM D482 | 0.11% |
| Carbon Content, wt. % as is | ASTM D5291 | 43.0% |
| Hydrogen Content, wt. % as is | ASTM D5291 | 7.72% |
| Nitrogen Content, wt. % as is | ASTM D5291 | 0.11% |
| Sulfur Content, wt. % as is | ASTM D1552 | 0.01% |
| Oxygen Content, wt. % as is | By Difference | 49.1% |
| HHV (as is), BTU/lb | ASTM D240 | 7703 |

The Cleaver Brooks boiler was originally designed to fire no. 4 light residual heating fuel oil in a burner at a maximum firing rate of 58.3 gallons per hour, equivalent to 8.5 MM Btu per hour, to produce steam at 15 psig and was retrofitted to additionally have a maximum firing rate of the retrofitted boiler was calculated, on a constant BTU basis (i.e., 8.5 MM Btu per hour maximum), to be 112.7 gallons per hour of the unenriched renewable fuel oil (RFO). The retrofitted boiler comprised compressed air soot blowers, which were cycled to prevent formation of deposits in the firetubes. The retrofitted boiler further comprised a cylindrical heat sink component proximate the flame zone in the fire box for absorbing, radiating and/or reflecting heat. The inner diameter of the cylindrical heat sink component was 19.5 inches. The outer diameter of the cylindrical heat sink component was 23.5 inches. The length of the cylindrical heat sink component was 48 inches.

Three tests, each approximately 60-minutes in length, were performed near the maximum firing rate to measure emissions exhaust flue gas produced by burning the unenriched renewable fuel oil (RFO) in the boiler. Results are summarized in Table 5.

TABLE 5

| | | Test 1<br>Time 841-941 | 2<br>1017-1117 | 3<br>1148-1248 | Average |
|---|---|---|---|---|---|
| Process Conditions | | | | | |
| Fuel Flow | gph | 104.0 | 107.1 | 107.1 | 106.1 |
| Load | % | 92.3% | 95.0% | 95.0% | 94.1% |
| Stack Conditions | | | | | |
| Flowrate | dscfm | 1,602 | 1,612 | 1,593 | 1,602 |
| Moisture | % | 16.9 | 16.6 | 16.1 | 16.5 |
| $O_2$ | % | 3.8 | 3.8 | 3.9 | 3.9 |
| $CO_2$ | % | 16.1 | 16.2 | 16.2 | 16.2 |
| PM Test Parameters | | | | | |
| Sample Volume | dscf | 41.9 | 41.1 | 40.4 | 41.1 |
| Isokinesis | % | 101.0 | 102.0 | 100.0 | 101.0 |
| Emissions | | | | | |
| NOx | ppm | 176 | 179 | 186 | 180 |
| | lbs/hr | 2.02 | 2.07 | 2.13 | 2.07 |
| | lbs/MMBtu | 0.238 | 0.243 | 0.253 | 0.245 |
| CO | ppm | 17.5 | 14.2 | 14.4 | 15.4 |
| | lbs/hr | 0.12 | 0.10 | 0.10 | 0.11 |
| | lbs/MMBtu | 0.014 | 0.012 | 0.012 | 0.013 |
| SO2 | ppm | <0.1 | 0.4 | <0.1 | <0.2 |
| | lbs/hr | <0.002 | 0.007 | <0.002 | <0.003 |
| | lbs/MMBtu | <1.88E-04 | 8.27E-04 | <1.89E-04 | <4.01E-04 |
| PM | gr/dscf | 0.10 | 0.09 | 0.09 | 0.09 |
| | lbs/hr | 1.36 | 1.21 | 1.19 | 1.25 |
| | lbs/MMBtu | 0.160 | 0.142 | 0.142 | 0.148 |

Emissions of Particulate Matter (PM) were determined in accordance with EPA methods 1-5. The soot blowers were operated for a few seconds at 15-minute intervals during the three tests.

Oxygen ($O_2$), carbon monoxide (CO), and carbon dioxide ($CO_2$) contents of the exhaust stream were determined according to EPA Methods 10 and 3A. Nitrogen oxides ($NO_x$) content was determined according to EPA method 7E. Sulfur dioxide ($SO_2$) content was determined according to EPA Method 6C.

Combustion efficiency averaged 99.99%, as reflected by the average measured CO concentration of 15.4 ppm.

Tables 6 and 7 compares the resulting average emissions in the RFO tests with various fossil fuels.

TABLE 6

| | RFO | Heating Fuel Oil No. 4 | Heating Fuel Oil No. 5 | Heating Fuel Oil No. 6 (low S) | Heating Fuel Oil No. 6 (high S) |
|---|---|---|---|---|---|
| | | Combustion Flue Gas Emissions, lbs/MMBtu | | | |
| CO | 0.013 | 0.033 | 0.033 | 0.033 | 0.033 |
| $NO_x$ | 0.245 | 0.13 | 0.37 | 0.37 | 0.37 |
| $SO_2$ | <0.0004 | 1.35 | 1.97 | 0.88 | 4.16 |
| PM | 0.148 | 0.047 | 0.067 | 0.073 | 0.26 |

TABLE 7

| | RFO | Natural Gas | ULSD | Distillate |
|---|---|---|---|---|
| | Combustion Flue Gas Emissions, lbs/MMBtu | | | |
| CO | 0.013 | 0.082 | 0.036 | 0.036 |
| $NO_x$ | 0.245 | 0.098 | 0.14 | 0.14 |

TABLE 7-continued

| | RFO | Natural Gas | ULSD | Distillate |
|---|---|---|---|---|
| | Combustion Flue Gas Emissions, lbs/MMBtu | | | |
| $SO_2$ | <0.0004 | 0.0006 | 0.0015 | 0.22 |
| PM | 0.148 | 0.0075 | 0.014 | 0.014 |

Example 3

An unenriched renewable fuel oil (RFO) was used to fire a retrofitted Cleaver Brooks CB-1-600-200-015 fire tube boiler (dual-fuel boiler). Table 8 gives compositional analysis of the unenriched renewable fuel oil (RFO).

TABLE 8

| Parameter | Test Method | RFO |
|---|---|---|
| Ash Content, wt. % | ASTM D482 | 0.11% |
| Carbon Content, wt. % as is | ASTM D5291 | 44.5% |
| Hydrogen Content, wt. % as is | ASTM D5291 | 7.32% |
| Nitrogen Content, wt. % as is | ASTM D5291 | 0.09% |
| Sulfur Content, wt. % as is | ASTM D1552 | 0.01% |
| Oxygen Content, wt. % as is | By Difference | 48.0% |
| HHV (as is), BTU/lb | ASTM D240 | 7590 |

The Cleaver Brooks boiler was originally designed to fire no. 4 light residual heating fuel oil in a burner at a maximum firing rate of 58.3 gallons per hour, equivalent to 8.5 MM Btu per hour, to produce steam at 15 psig and was retrofitted to additionally have a maximum firing rate of the retrofitted boiler was calculated, on a constant BTU basis (i.e., 8.5 MM Btu per hour maximum), to be 112.7 gallons per hour of the unenriched renewable fuel oil (RFO). The retrofitted boiler comprised compressed air soot blowers, which were cycled to prevent formation of deposits in the firetubes. The retrofitted boiler further comprised a cylindrical heat sink component proximate the flame zone in the fire box for absorbing, radiating and/or reflecting heat. The inner diameter of the cylindrical heat sink component was 19.5 inches. The outer diameter of the cylindrical heat sink component was 23.5 inches. The length of the cylindrical heat sink component was 48 inches.

Three tests, each approximately 60-minutes in length, were performed near the maximum firing rate to measure emissions exhaust flue gas produced by burning the unenriched renewable fuel oil (RFO) in the boiler. Results are summarized in Table 9.

TABLE 9

| | Test<br>Time | 1<br>923-1023 | 2<br>1125-1225 | 3<br>1301-1401 | Average |
|---|---|---|---|---|---|
| Process<br>Conditions | | | | | |
| Fuel Flow | gph | 105.3 | 113.2 | 110.2 | 109.6 |
| Load | % | 94.0% | 101.1% | 98.4% | 97.8% |
| Stack<br>Conditions | | | | | |
| Flowrate | dscfm | 1,629 | 1,584 | 1,587 | 1,600 |
| Moisture | % | 14.6 | 15.7 | 15.7 | 15.3 |
| $O_2$ | % | 4.5 | 4.2 | 4.3 | 4.3 |
| $CO_2$ | % | 15.7 | 15.8 | 16.0 | 15.8 |
| PM Test<br>Parameters | | | | | |
| Sample<br>Volume | dscf | 41.9 | 41.1 | 40.4 | 41.1 |
| Isokinesis | % | 101.0 | 102.0 | 100.0 | 101.0 |
| Emissions | | | | | |
| NOx | ppm | 144 | 165 | 169 | 159 |
| | lbs/hr | 1.68 | 1.88 | 1.92 | 1.83 |
| | lbs/MMBtu | 0.210 | 0.237 | 0.243 | 0.230 |
| CO | ppm | 77 | 101 | 107 | 95 |
| | lbs/hr | 0.55 | 0.70 | 0.74 | 0.66 |
| | lbs/MMBtu | 0.068 | 0.088 | 0.094 | 0.083 |
| SO2 | ppm | 0.2 | 0.4 | 5.6 | 2.1 |
| | lbs/hr | 0.004 | 0.007 | 0.088 | 0.033 |
| | lbs/MMBtu | 4.85E-04 | 8.76E-04 | 1.12E-02 | 4.18E-83 |
| PM | gr/dscf | 0.11 | 0.09 | 0.09 | 0.10 |
| | lbs/hr | 1.60 | 1.27 | 1.25 | 1.37 |
| | lbs/MMtu | 0.200 | 0.161 | 0.158 | 0.173 |

Emissions of Particulate Matter (PM) were determined in accordance with EPA methods 1-5. The soot blowers were operated for a few seconds at 15-minute intervals during the three tests.

Oxygen ($O_2$), carbon monoxide (CO), and carbon dioxide ($CO_2$) contents of the exhaust stream were determined according to EPA Methods 10 and 3A. Nitrogen oxides ($NO_x$) content was determined according to EPA method 7E. Sulfur dioxide ($SO_2$) content was determined according to EPA Method 6C.

Combustion efficiency averaged 99.94%, as reflected by the average measured CO concentration of 95 ppm.

In the description above, for purposes of explanation only, specific embodiments have been presented and/or exemplified. It should be understood that variations of various aspects of an embodiment may be combined with other stated components, embodiments, ranges, types, etc. For example, there are embodiments that discuss the handling and combustion of an unenriched renewable fuel oil and it should be understood that any and all of the types of an unenriched renewable fuel oil discussed and/or presented herein may be substituted and/or combined into such embodiments even though an embodiment may not be specifically presented with the particular type of an unenriched renewable fuel oil in the description.

While numerous embodiments of the present invention have been shown and described herein, it will be obvious to those skilled in the art that such embodiments are provided by way of example only. It is intended that the following claims or future claims that may be added and/or amended in this or future continuing applications, in this or other countries and territories, define the scope of the invention and that methods and structures and products and uses within the scope of these claims and their equivalents be covered thereby.

What is claimed is:

1. A dual-fuel method of heating, comprising:
   i) introducing a petroleum-based fuel into a dual-fuel burner followed by combusting said fuel, wherein the petroleum-based fuel is heating oil; and
   ii) combusting an unenriched renewable fuel oil, comprising:
      a) introducing said renewal fuel oil into the dual-fuel burner at a ratio of 1.5:1 to 2:1, on a volume basis, relative to the introduced petroleum-based fuel;
      b) atomizing the unenriched renewable fuel oil in the dual-fuel burner to form a spray cone;
      c) aiming the spray cone proximate a radiant surface to at least partially vaporize the spray cone; and
      d) combusting the at least partially vaporized spray cone proximate a heat sink, said heat sink in thermal communication with the radiant surface.

2. The method of claim 1, wherein the unenriched renewable fuel oil is blended with ethanol.

3. The method of claim 1, further comprising: alternating between steps i and ii in response to estimated cumulative particulate emissions.

4. The method of claim 1, wherein the renewable fuel oil has an ash content of less than 0.07 wt. %.

5. The method of claim 1, wherein the renewable fuel oil contains at least 20 wt. % water.

6. The method of claim 1, wherein the unenriched renewable fuel oil is formed by non-catalytic rapid thermal processing of a cellulosic biomass.

7. The method of claim 1, wherein combustion steps i and ii are performed separately.

8. The method of claim 1, wherein the radiant surface and the heat sink together comprise a refractory sleeve.

9. The method of claim 8, wherein the refractory sleeve comprises a tube-shaped component having a length-to-diameter ratio in the range of 1.5:1-2.5:1.

10. The method of claim 8, wherein the refractory sleeve shields at least 25% of a flame generated during combustion of the at least partially vaporized spray cone.

11. The method of claim 1, further comprising: heating the unenriched renewable fuel oil from a temperature in the range of 10-40° C. to a temperature in the range of 50-70° C. for a period of no more than 20 seconds prior to introduction to the dual-fuel burner.

12. The method of claim 1, wherein a flow rate of a combustion air stream to the dual-fuel burner is adjusted to maintain a target flue gas oxygen concentration.

13. The method of claim 1, wherein feed rates of the petroleum-based fuel and the unenriched renewable fuel oil are adjusted to maintain a target pressure in a boiler.

14. The method of claim 1, further comprising: purging the dual-fuel burner of residual unenriched renewable fuel oil after the completion of step ii.

15. A dual-fuel method of heating, comprising:
   i) introducing a petroleum-based fuel into a dual-fuel burner followed by combusting said fuel; and
   ii) combusting an unenriched renewable fuel oil, comprising:
      a) introducing said renewal fuel oil into the dual-fuel burner at a ratio of 1.5:1 to 2:1, on a volume basis, relative to the introduced petroleum-based fuel;
      b) atomizing the unenriched renewable fuel oil in the dual-fuel burner to form a spray cone;
      c) aiming the spray cone proximate a radiant surface to at least partially vaporize the spray cone; and
      d) combusting the at least partially vaporized spray cone proximate a heat sink, said heat sink in thermal communication with the radiant surface;
   iii) passing a combustion flue gas through fire tubes of a firetube boiler; and
   iv) providing at least one pulse of compressed gas per day to the fire tubes in the direction of flow of the combustion flue gas.

16. The method of claim 15, wherein the unenriched renewable fuel oil is blended with ethanol.

17. The method of claim 15, wherein the unenriched renewable fuel oil is formed by non-catalytic rapid thermal processing of a cellulosic biomass.

18. The method of claim 15, wherein combustion steps i and ii are performed separately.

19. The method of claim 15, wherein the radiant surface and the heat sink together comprise a refractory sleeve.

20. The method of claim 19, wherein the refractory sleeve comprises a tube-shaped component having a length-to-diameter ratio in the range of 1.5:1-2.5:1.

21. The method of claim 19, wherein the refractory sleeve shields at least 25% of a flame generated during combustion of the at least partially vaporized spray cone.

22. The method of claim 15, further comprising: heating the unenriched renewable fuel oil from a temperature in the range of 10-40° C. to a temperature in the range of 50-70° C. for a period of no more than 20 seconds prior to introduction to the dual-fuel burner.

23. The method of claim 15, wherein a flow rate of a combustion air stream to the dual-fuel burner is adjusted to maintain a target flue gas oxygen concentration.

24. The method of claim 15, wherein feed rates of the petroleum-based fuel and the unenriched renewable fuel oil are adjusted to maintain a target pressure in a boiler.

25. The method of claim 15, wherein the at least one pulse of compressed gas comprises up to eight pulses of air per day at a pressure of 100 psig.

* * * * *